United States Patent [19]
Nanba et al.

[11] Patent Number: 5,663,833
[45] Date of Patent: Sep. 2, 1997

[54] IMAGE DISPLAY APPARATUS

[75] Inventors: Norihiro Nanba, Kawasaki; Tsunefumi Tanaka, Yokohama; Hideki Morishima, Kawasaki; Takeshi Akiyama, Yokohama, all of Japan

[73] Assignee: Canon Kabushiki Kaisha, Tokyo, Japan

[21] Appl. No.: 363,537

[22] Filed: Dec. 23, 1994

[30] Foreign Application Priority Data

Dec. 27, 1993 [JP] Japan .................. 5-330728

[51] Int. Cl.$^6$ .................... G02B 27/14
[52] U.S. Cl. .................... 359/631; 359/633
[58] Field of Search .................... 359/727–731, 359/631–633

[56] References Cited

U.S. PATENT DOCUMENTS

| 3,697,154 | 10/1972 | Johnson | 359/631 |
| 5,184,250 | 2/1993 | Lacroix | 359/631 |
| 5,384,654 | 1/1995 | Iba | 359/631 |

FOREIGN PATENT DOCUMENTS

| 365406A1 | 4/1990 | European Pat. Off. . |
| 460983A1 | 11/1991 | European Pat. Off. . |
| 526067A2 | 3/1993 | European Pat. Off. . |
| 2730635 | 1/1979 | Germany . |

OTHER PUBLICATIONS

Johnson, Barry, R., Wide field of view three–mirror telescopes having a common optical axis, Optical Engineering, vol. 27, No. 2, Dec. 1988, Bellingham, US, pp. 1046–1050.

Primary Examiner—Georgia Y. Epps
Assistant Examiner—John P. Cornely
Attorney, Agent, or Firm—Morgan & Finnegan LLP

[57] ABSTRACT

An image display apparatus comprises an image display device for emitting a light beam to display an image, and an observation optical system for guiding the light beam from the image display device to the pupil of an observer. The observation optical system has at least a concave, reflective surface and a convex, reflective surface in order from the pupil side of the observer along an optical axis of the light beam directed from the image display device to the pupil. The concave, reflective surface is located near the pupil.

11 Claims, 13 Drawing Sheets

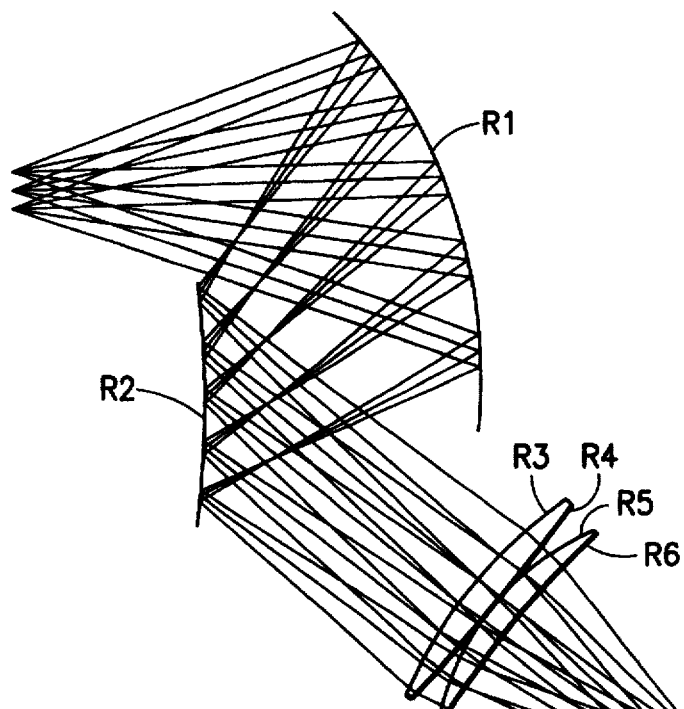
FIG. 11
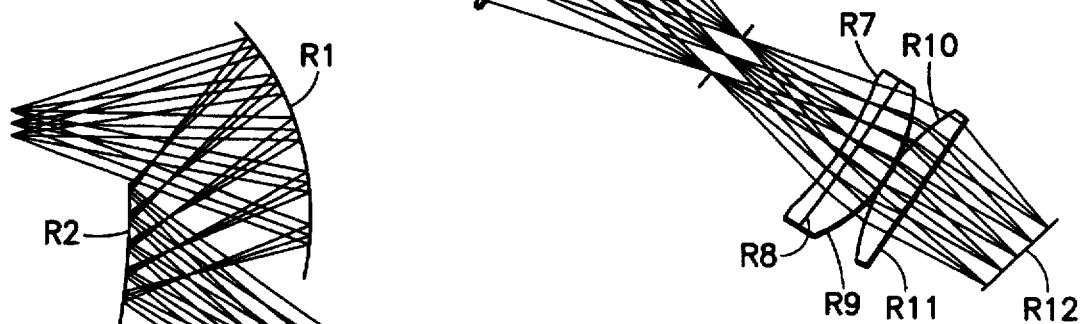
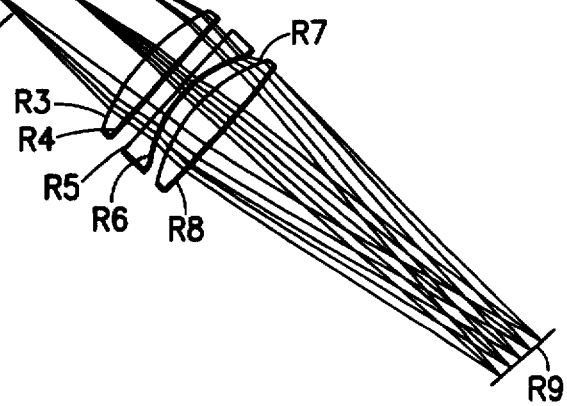
FIG. 12

FIG. 18A (Y-DIRECTION) (0°, 20°) 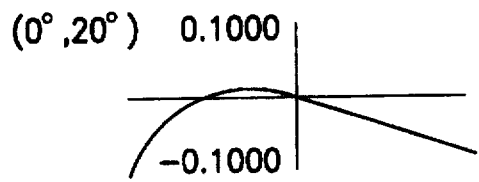
FIG. 18B (Y-DIRECTION) (0°, 8°) 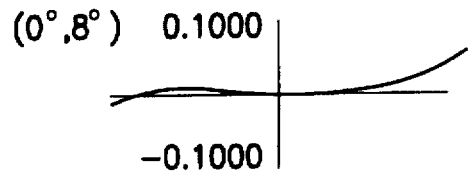
FIG. 18C (Y-DIRECTION) (0°, -4°) 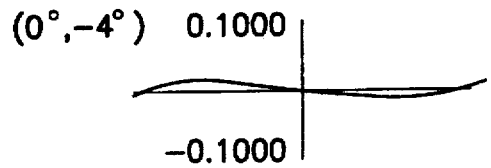
FIG. 18D (Y-DIRECTION) (0°, -16°) 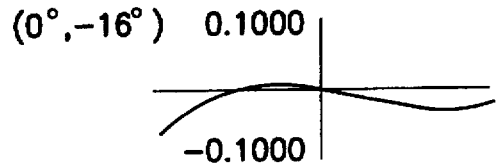
FIG. 18E (Y-DIRECTION) (0°, -28°) 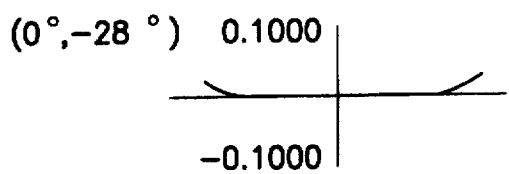
FIG. 18F (X-DIRECTION) (15°, -4°) 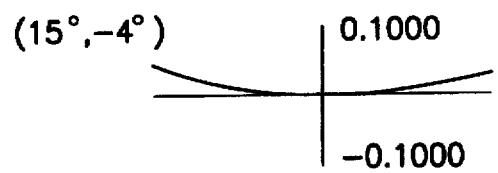
FIG. 18G (X-DIRECTION) (10°, -4°) 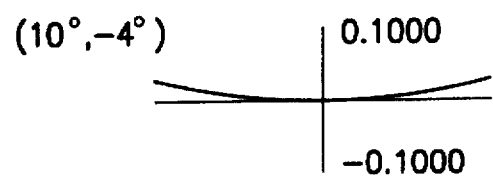
FIG. 18H (X-DIRECTION) (5°, -4°) 
FIG. 18I (X-DIRECTION) (0°, -4°) 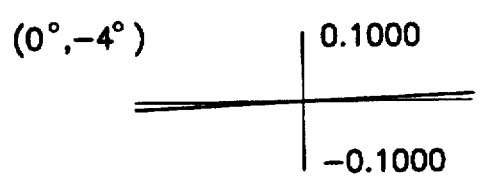

IMAGE DISPLAY APPARATUS

BACKGROUND OF THE INVENTION

1. Field of the Invention

The present invention relates to an image display apparatus for observing an enlarged virtual image of an image on image display means, as being set near an eye portion of an observer, and more particularly to an image display apparatus with a wide field angle and with an excellent image quality.

2. Related Background Art

As conventional image display apparatus to be set near the eye of observer, there are helmet mounted displays incorporated with a helmet, and head mounted displays smaller and lighter than those, a support member of which is mounted on the head. Either of these is so arranged that an image displayed on an image display device such as CRT, LCD, etc. is enlarged and displayed as a virtual image ahead of the observer through an observation optical system.

The conventional display apparatus of this type are roughly classified into whether an eyepiece optical system in the observation optical system uses a reflection optical system or not.

An example of the eyepiece optical system not using the reflection optical system is an optical system of electric viewfinder used in video cameras etc. The optical system of this type is so arranged that an image displayed on LCD etc. is enlarged and displayed as a virtual image for the observer, using an eyepiece lens.

Those using the reflection optical system are classified into whether the observation optical system is a coaxial system or a decentered system.

Well-known systems with the observation optical system being a coaxial system are those as disclosed in Japanese Laid-open Patent Application No. 3-39924 and U.S. Pat. No. 5,151,722. FIG. 1 shows a schematic drawing of an optical system of this type. Numeral 121 designates an image display device, 122 a relay optical system for relaying an image on the image display device 121 to form an intermediate image thereof, 123 an intermediate image surface located on an image-forming plane of the relay optical system, 124 a plane beam splitter, 125 a spherical, reflective surface, and 126 an eye point where the pupil of observer is located. The image displayed on the image display device 121 curved in a concave shape is relayed through the relay optical system 122 to form an aerial image on the intermediate image surface 123. This aerial image is guided to the observer's pupil located at the eye point 126, using the spherical, reflective surface 125 as an eyepiece optical system, whereby the observer can observe a virtual image farther than the spherical, reflective surface 125. On this occasion, the plane beam splitter 124 is so arranged that it reflects light beams from the aerial image on the intermediate image surface 123 toward the spherical, reflective surface 125 and that it transmits light beams reflected by the spherical, reflective surface 125.

As one with the observation optical system being a decentered system, U.S. Pat. No. 4,854,688 discloses an optical system in which the above, spherical, reflective surface is decentered.

Also, U.S. Pat. No. 3,787,109 discloses a system not using the plane beam splitter, which is an optical system arranged in such a manner that beams from a display surface in the image display means are guided to the observer's pupil by a reflective surface decentered from the optical axis of the pupil, without forming an intermediate image. This shows the image display apparatus in which beams from the display surface in the image display means are guided to the observer's pupil while being reflected and converged by a curved mirror of a concave surface and in which the shape of the concave, curved mirror is a part of a paraboloid of revolution and the center of display image is located at the focus of the paraboloid of revolution. Further, U.S. Pat. No. 3,833,300 discloses an optical system having an eyepiece system utilizing a reflective surface shaped in a paraboloid of revolution, as in U.S. Pat. No. 3,787,109, in which two reflective surfaces in the shape of paraboloid of revolution are provided for the left and right eyes, respectively, and are integral with each other.

The paper, D. J. Rotier, "Optical Approaches to the Helmet Mounted Display" (Proceedings SPIE Vol. 1116, Helmet-Mounted Displays, 1989, P14–18), discloses an optical system which forms an intermediate image of the display image, in which a part of the relay optical system, and the eyepiece optical system are constructed of a reflective surface using a partial surface shape of a same paraboloid of revolution. FIG. 2 shows the schematic structure of the optical system. In FIG. 2, numeral 131 designates image display means, 132 a refracting optical system, 133 a reflective surface in the shape of a paraboloid of revolution, 134 a plane, reflective surface arranged to be perpendicular to an axis of revolution A of the paraboloid of revolution which is the reflective surface shape of reflective surface 133 and to include the focus B thereof, 135 a reflective surface arranged on the paraboloid of revolution being the reflective surface shape of the reflective surface 133 and in symmetry with the reflective surface 133 with respect to the axis of revolution A, and 136 an eye point where the observer's pupil is located. Beams from the image display means 131 are guided by the relay optical system of the refracting optical system 132 and the reflective surface 133 to form an image near the plane, reflective surface 134. Then beams from this image are guided to the eye point 136 by the eyepiece optical system of the reflective surface 135. In such a system, the optical system as described in "Optical Approaches to the Helmet Mounted Display" is so arranged that axial beams from the image display means 131 are focused at the focal point B on the plane, reflective surface 134 and then the observer observes a virtual image of the display screen at the infinity from the eye point 136.

Also, Japanese Laid-open Patent Application No. 2-297516 discloses a thinner structure in which the one plane, reflective surface in the above optical system as described in "Optical Approaches to the Helmet Mounted Display" is replaced by a plurality of plane, reflective surfaces.

Further, Japanese Laid-open Patent Application No. 5-134208 discloses a system in which beams from the display surface in image display means are relayed by a refracting relay optical system to form an intermediate image and this intermediate image is made to be observed through an eyepiece optical system having a reflective surface shaped in an ellipsoid of revolution. FIG. 3 shows the schematic structure of the system. In FIG. 3, numeral 141 designates image display means, 142 a refracting optical system, 143 an aperture of the refracting optical system, 144 a reflective surface in the shape of an ellipsoid of revolution, and 145 an eye point where the observer's pupil is located. Beams from the image display means 141 are guided by the relay optical system of the refracting optical system 142 to form an intermediate image. Beams from the intermediate image are guided by the eyepiece optical system of the reflective surface 144 to the eye point position 145. In such structure, the aperture 143 of the relay optical system is located at one focal point of the ellipsoid of revolution 144 being the reflective surface and the eye point 145 where the observer's pupil is located is located at the other focal point, thereby establishing a relation of pupil image formation between the pupil 143 of the relay optical system and the pupil at the eye point 145.

In the case of the structure of the optical system of electric viewfinder, information of external view cannot be provided to the observer, because the image display means is located on the optical axis of the observer's pupil. Also, because the focal length of eyepiece lens becomes shorter with an increase of field angle, the distance becomes shorter between the image display surface and the principal plane on the display surface side, of the eyepiece lens. In such structure, particularly where the image display means is one having contrast characteristics with directivity in the direction approximately perpendicular to the display surface, such as LCD, it is effective to use a concave lens having a diverging effect between the eyepiece lens and the display surface in order to provide images with wide field angle and with high contrast. This arrangement, however, had a problem that a distortion appeared with an increase of the field angle.

In the systems as disclosed in Japanese Laid-open Patent Application No. 3-39924 and U.S. Pat. No. 5,151,722, the plane beam splitter 124 needs to be set as inclined relative to the optical axis of the pupil between the spherical, reflective surface 125 and the observer's pupil. Since the distance is long between the eye point 126 and the spherical, reflective surface 125 being the eyepiece optical system, such an arrangement has a problem that the outer diameter of the spherical, reflective surface 125 becomes larger for wider field angles. In particular, where two image display apparatus are symmetrically arranged for binocular vision, physical interference would occur and thus this arrangement is not suitable for image display apparatus for wide field angle. Since beams emitted from the image display device 121 are subjected to reflection and transmission at the plane beam splitter 124, they lose a lot of light quantity there, thus causing a problem of failing to obtain a bright virtual image.

In U.S. Pat. No. 4,854,688, the above spherical, reflective surface is decentered relative to the optical axis of the pupil. If two image display apparatus are symmetrically arranged for binocular vision in this arrangement, end faces in the direction of the symmetry axis, of the spherical, reflective surfaces become closer to the observer's pupils. Thus, this arrangement can be thinner than the arrangement of Japanese Laid-open Patent Application No. 3-39924. However, because the plane beam splitter needs to be set between the spherical, reflective surface and the observer's pupil, the spherical, reflective surface cannot be set nearer to the pupil than the plane half mirror. Since the outer diameter of the spherical, reflective surface is determined by the distance from the eye point at a certain field angle, such structure does not allow the outer diameter of the spherical, reflective surface to be decreased. Therefore, this arrangement is not suitable for apparatus required to have a wide field angle. Also, the decentering of the spherical, reflective surface causes new decentering aberrations, but the arrangement of U.S. Pat. No. 4,854,688 failed to correct a decentering distortion and a decentering astigmatism. Another problem is a great loss of light quantity because it uses the beam splitter, as in Japanese Laid-open Patent Application No. 3-39924.

In U.S. Pat. No. 3,787,109 there is no optical member between the observer's pupil and the paraboloid-of-revolution mirror for guiding beams to the pupil, which can permit a so-called high eye point structure having a spatial room in the direction of the optical axis of the observer's pupil at the eye point. Since the paraboloid-of-revolution mirror reflects beams emerging from a focal point in the form of collimated beams, a virtual image can be displayed at infinity without spherical aberration. Thus, an image at the center of screen can be observed in a good state. However, off-axial beams emerging from positions away from the focal point of paraboloid of revolution are not converted into parallel beams by the paraboloid-of-revolution mirror and a decentering coma newly appears. Further, because there is no optical element for correcting aberrations generated by the paraboloid-of-revolution mirror, the off-axial beams will produce decentering aberrations such as a decentering curvature of field, a decentering distortion, etc. in addition to the decentering coma. Thus, only the image displayed near the focal point of paraboloid of revolution can be observed in a good state. Accordingly, there is a problem that a good virtual image cannot be displayed except for a narrow field angle. U.S. Pat. No. 3,833,300 also has the same problem.

With the optical system for helmet mounted display as described in "Optical Approaches to the Helmet Mounted Display," ignoring the spherical aberration in the refracting optical system 132, there occurs no spherical aberration in either of the reflective surfaces 133, 135 from the relation between the paraboloid of revolution and the focal point. Thus, correcting the spherical aberration in the refracting optical system 132, the spherical aberration by the overall system can also be corrected. Since off-axial beams are not focused at the focal point position of the paraboloid of revolution, a coma is generated by either of the reflective surfaces 133, 135, similarly as in U.S. Pat. No. 3,787,109, but the comas are corrected by canceling them with each other by the symmetry in the arrangement of the reflective surfaces 133, 135. Such an arrangement, however, includes no consideration about the pupil image formation on the pupil of the relay optical system composed of the refracting optical system 132 and the reflective surface 133, and on the pupil at the eye point at all. In order to permit the observer to observe the entire display image at the eye point 136, it is necessary that principal rays at each field angle intersect with each other at the eye point 136. However, because the pupil image formation is not good, the pupil position of the relay optical system composed of the refracting optical system 132 and the reflective surface 133 varies depending upon the field angle. Thus, this arrangement has a problem that a decentering distortion as shown in FIG. 4 appears. Also, because the pupil image formation is not good on the pupil of the above relay optical system and on the pupil at the eye point, the numerical aperture NA on the display surface side of the relay optical system differs depending upon the field angle, resulting in a problem that the observer observes a virtual image with luminance variations.

The optical system as disclosed in Japanese Laid-open Patent Application No. 2-297516 also has the same basic structure and thus has the same problems.

Japanese Laid-open Patent Application No. 5-134208 employs the reflective surface 144 in the shape of ellipsoid of revolution, whereby the pupil image formation is established for the eye point 145 and the relay optical system 142. Further, decentering aberrations generated by the ellipsoid-of-revolution reflective surface 144 are attempted to correct using decentered lenses in the relay optical system 142. However, because the optical system is so arranged that the pupil 143 of relay optical system 142 is inclined a lot relative to the principal ray of the axial beam, correction of aberrations due to the decentering of the relay optical system 142 becomes more difficult as the field angle becomes wider. Especially, correction of distortion is difficult and thus it is not suitable for apparatus required to have a wide field angle. The distortion in such an arrangement is asymmetric as shown in FIG. 5 because of the decentering of the optical system. Thus, supposing two same optical systems are symmetrically arranged for binocular vision, a problem is that it becomes difficult for the observer to achieve fusion of left and right virtual images. Another problem is low degrees of freedom on arrangement of the relay optical system etc., because the aperture position 143 of the relay optical system 142 is restricted by the ellipsoidal shape of the reflective surface 144.

SUMMARY OF THE INVENTION

In view of the above problems, an object of the present invention is to provide an image display apparatus which can achieve a wide field angle and an excellent image quality while keeping an asymmetric distortion due to decentering small.

One aspect of the image display apparatus of the present invention for achieving the above object is an image display apparatus comprising:

image display means for emitting light to display an image; and an observation optical system for guiding a beam from said image display means to the pupil of an observer, said observation optical system having at least a concave, reflective surface and a convex, reflective surface in order from a pupil side of said observer along an optical axis of the beam directed from said image display means to said pupil, said concave, reflective surface being located near said pupil.

In a preferred embodiment, said observation optical system has a relay optical system located on a side of said image display means with respect to said convex, reflective surface along said optical axis, said relay optical system forms an aerial image of said display image near said convex, reflective surface, and an image of a pupil of said relay optical system is formed at a position of the pupil of said observer.

In a preferred embodiment, said concave, reflective surface and said convex, reflective surface each are arranged as decentered relative to said optical axis, and said convex, reflective surface is set at a position where said convex, reflective surface does not interrupt a beam directed toward the pupil of said observer after the beam from said image display means is reflected by said concave, reflective surface. Also, the apparatus is characterized in that at least one surface out of said concave, reflective surface and said convex, reflective surface is a reflective surface a curved surface shape not having a rotation symmetry axis.

In a preferred embodiment, said relay optical system has an optical element having a positive optical power, said concave, reflective surface, said convex, reflective surface, and said optical element constitute a triplet arrangement, and the pupil of said relay optical system is located on the side of said image display means with respect to said optical element along said optical axis. Further, the apparatus is characterized in that said optical element is a concave, reflective surface.

In a preferred embodiment, said relay optical system is an optical system which is approximately telecentric on a side of said aerial image.

In a preferred embodiment, said relay optical system has at least one refracting lens set as decentered relative to the optical axis thereof.

In a preferred embodiment, said relay optical system is constructed only of reflective surfaces, and, further, said relay optical system has a concave, reflective surface, a convex, reflective surface, and a concave, reflective surface in order from the side of said convex, reflective surface along said optical axis.

In a preferred embodiment, said concave, reflective surface of said observation optical system is a beam splitter having a predetermined light transmittance.

A preferred embodiment of the image display apparatus of the present invention is characterized in that the beam from said image display means is guided to either left or right pupil of the observer by said observation optical system and two said image display apparatus and two image observation optical systems are symmetrically arranged for the left and right pupils of the observer. Further, the apparatus is characterized in that the beam from said image display means is guided through eyeglasses to either left or right pupil of the observer by said observation optical system.

A preferred embodiment of the image display apparatus of the present invention is a head mounted display also including holding means for securing said image display apparatus to the head of the observer.

The image display apparatus of the present invention will become apparent by some embodiments as described hereinlater.

BRIEF DESCRIPTION OF THE DRAWINGS

FIG. 11 is a cross-sectional view of an optical system in embodiment 1 of the present invention;

FIG. 12 is a cross-sectional view of an optical system in embodiment 2 of the present invention;

FIGS. 18A to 18I are aberration diagrams of embodiment 3 of the present invention.

DETAILED DESCRIPTION OF THE PREFERRED EMBODIMENTS

Figure 2:
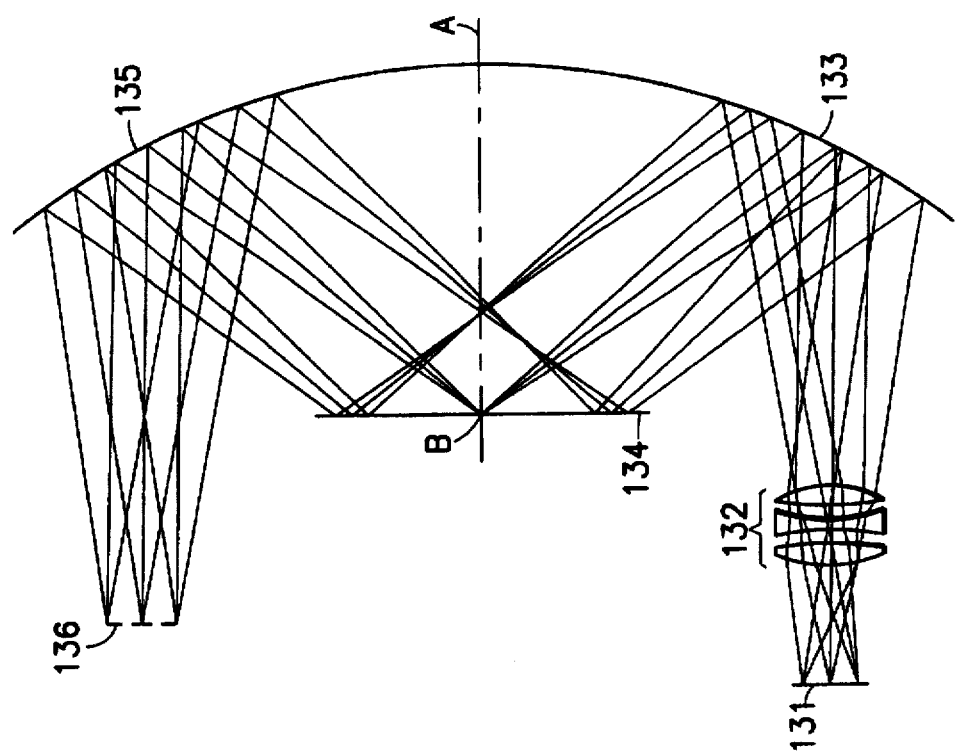
FIG. 2 is a drawing to show an optical system in another conventional image display apparatus.
Figure 1:
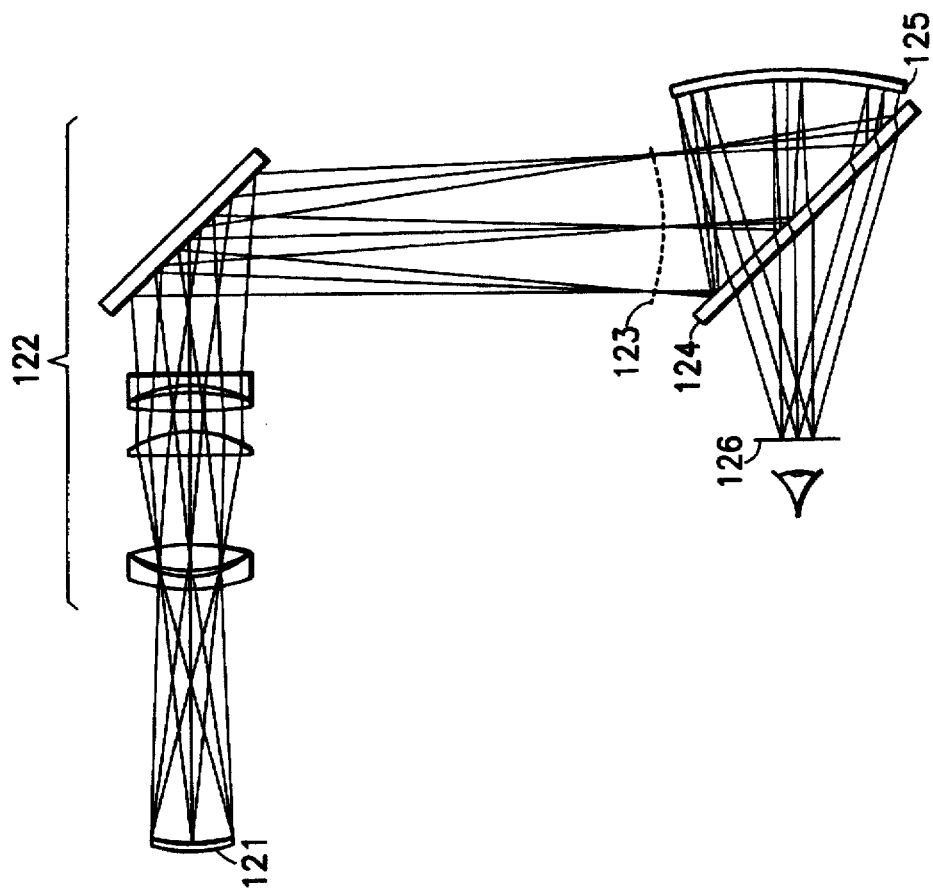
FIG. 1 is a drawing to show an optical system in a conventional image display apparatus.
Figure 3:
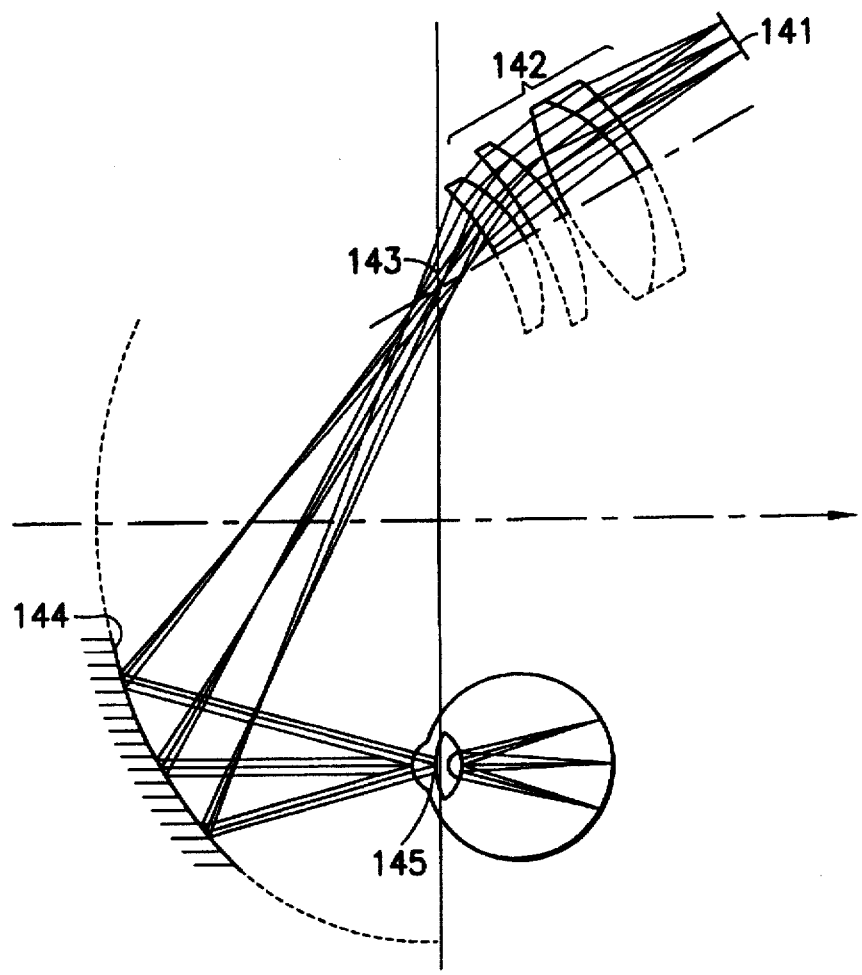
FIG. 3 is a drawing to show an optical system in another conventional image display apparatus.
Figure 4:
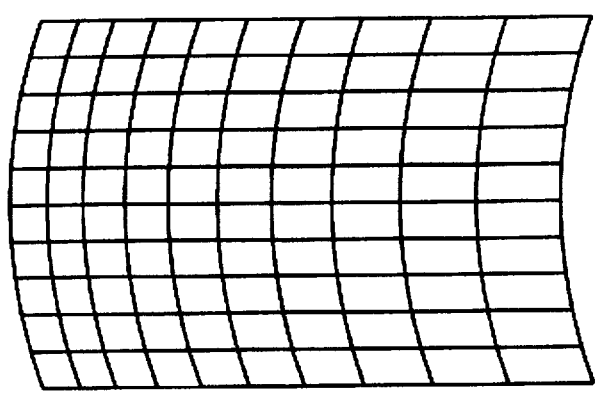
FIG. 4 is a drawing to show a distortion of the optical system in the conventional image display apparatus.
Figure 5:
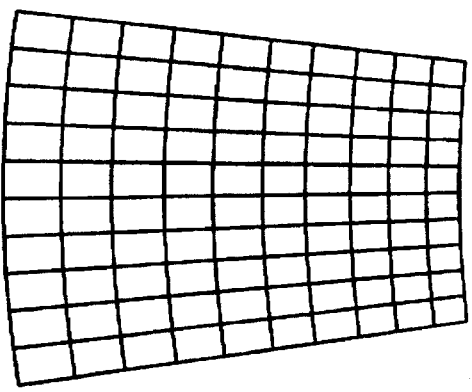
FIG. 5 is a drawing to show a distortion of the optical system in the conventional image display apparatus.
Figure 6:
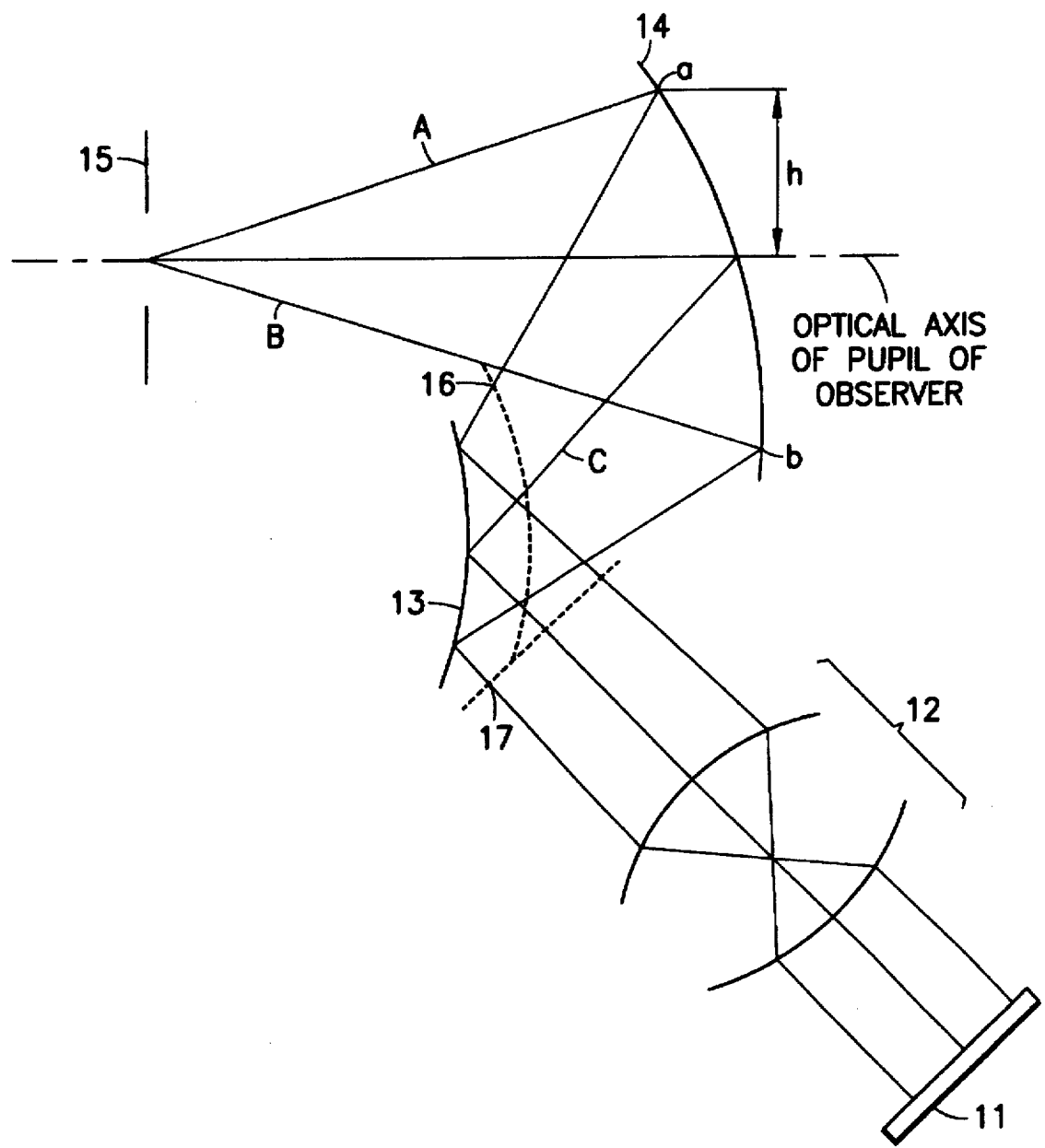
FIG. 6 is a schematic drawing to show the structure of an optical system in an image display apparatus of the present invention.

FIG. 6 is a schematic drawing of an image display apparatus of the present invention. Reference numeral 11 designates display such as CRT, LCD, etc., 12 a relay optical system for relaying beams from a display image on the display 11 to form an intermediate image thereof, 13 a convex, reflective surface reflecting beams from the relay optical system 12, 14 a concave, reflective surface as an eyepiece for guiding beams from the reflective surface 13 to the observer's pupil, and 15 an eye point where the observer's pupil is located. Here, the intermediate image surface is located between the reflective surfaces 13 and 14 (on 16 in FIG. 6) or between the relay optical system 12 and the reflective surface 13 (on 17 in FIG. 6). That is, the intermediate image surface is located near the reflective surface 13. In the case of the former, the reflective surface 13 is a part of the relay optical system for forming the intermediate image surface, while in the case of the latter, it is a part of the eyepiece. In the present invention, the position of the eye point is defined at a position where principal rays of respective field angles cross each other, as at the position of the aperture of the relay optical system 12. A light beam emitted from the center of the display surface of the image display means 11 is an axial beam. In FIG. 6, a ray C represents the principal ray of the axial beam, while rays A and B the principal rays of beams of maximum field angles in the plane of the drawing.

Next described is regarding as image-forming in the optical system of FIG. 6.

First described is the case where the intermediate image surface is 16 in the drawing. An image displayed on the image display means 11 is guided by the relay optical system 12 and the reflective surface 13 to form the intermediate image surface 16 as an aerial image. Beams from the intermediate image surface 16 are collected by the reflective surface 14 shaped as a concave surface to be guided to the eye point 15. Namely, the reflective surface 14 functions as the eyepiece. Here, the reflective surface 14 is arranged decenteredly relative to the optical axis of the observer's pupil. Namely, the center of curvature of the reflective surface is not on the optical axis.

Next described is the case where the intermediate image surface is 17 in the drawing. The image displayed on the image display means 11 is guided by the relay optical system 12 to form the intermediate image surface 17 as an aerial image. Beams from the intermediate image surface 17 are reflected on the reflective surface 13 shaped as a convex surface to the reflective surface 14. Reflective surface 13 makes principal rays of each fields reflect divergingly. Beams from the reflective surface 13 are collected by the reflective surface 14 shaped as a concave surface to be guided to the eye point 15. Namely, the reflective surfaces 13, 14 function as the eyepiece. Here, the reflective surface 14 is arranged decenteredly relative to the optical axis of the observer's pupil.

In either case of the intermediate image surface being 16 or 17, the above-described arrangement includes no optical member such as a beam splitter disposed between the reflective surface 14 and the eye point 15, whereby eyepiece with long eye relief can be possible in which a great spatial room is give in the direction of the optical axis of observer's eye at the eye point 15, while keeping a wide field angle. Also, because the arrangement that the reflective surface 14 is decentered relative to the optical axis of the observer's pupil makes a position where the principal ray A of the off-axial beam in FIG. 6 is reflected by the reflective surface 14, closer to the eye point 15, a distance h in FIG. 6 can be set shorter. Accordingly, in spite of the wide field angle and long eye relief, the outer diameter of projection of the reflective surface 14 on the plane perpendicular to the optical axis of observer can be set smaller. Thus, the structure is advantageous in respect of achievement of wider field angle where two same optical systems are symmetrically arranged for binocular vision.

Here, the decentration of the reflective surface 14 generates various decentering aberrations except for a chromatic aberration, but the reflective surface 13 can be provided with a correcting function by decentering the reflective surface 13 of convex shape. Also, correction shortage by the reflective surface 13 can be corrected using a decentering system for the relay optical system 12. The principle of aberration correction is next described.

First, a decentering distortion can be corrected by making good the image-forming of pupil on the pupil 15 at the eye point and on the pupil of the relay optical system 12.

Figure 7:
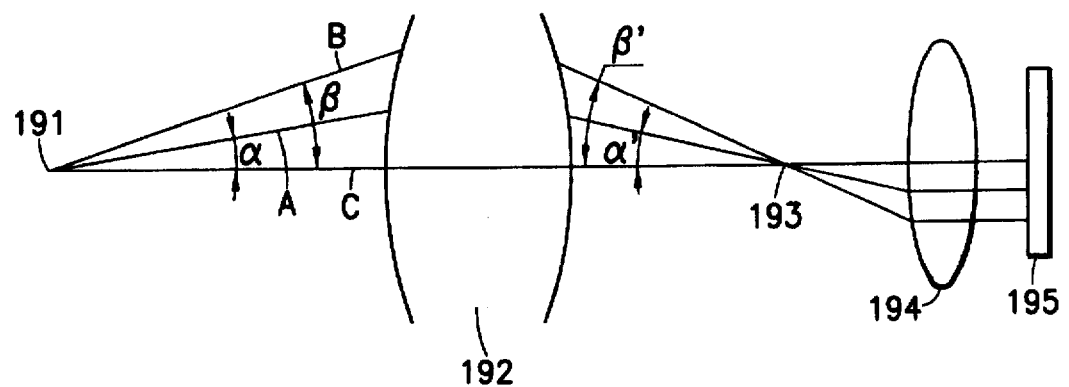
FIG. 7 is a drawing to show an imaging relation at pupils.

As for the decentering distortion, a rotationally asymmetric distortion due to decentration can be corrected if the stigmatism, in which the principal rays of respective field angles are in a point-to-point image-forming relation between the eye point and the pupil point of the relay optical system, holds for any principal ray and if the principal rays of the respective field angles are incident into the eye point in rotational symmetry the principal ray of the center field angle wherein the principal ray is defined as a rotational axis. Namely, when entering the eye point, the principal rays emitted from points an equal distance apart from a display point of the center field angle on the image display surface need to gather rotation-symmetrically at the eye point. Further, it is preferred as to the correction of distortion that angles of the principal rays of respective field angles relative to the principal ray of the center field angle have correspondence at the eye point and at the pupil of the relay optical system. FIG. 7 shows an image-forming relation of the principal rays at the eye point and at the pupil of the relay optical system. In FIG. 7, numeral 191 denotes the eye point, 192 an optical system including the decentered system, 193 the pupil conjugate with the eye point 191, 195 the image display surface, and 194 an optical system between the image display surface 195 and the pupil 193. Beams emitted from the image display surface 195 are focused on an optical path between the pupil 193 and the eye point 191. In other words, there is an image plane conjugate with the image display surface 195 between the pupil 193 and the eye point 191, so that an optical system on the side of image display surface 195 with respect to this image plane is the relay optical system while an optical system on the eye point side with respect to the image plane is the eyepiece. Thus, the pupil 193 is a pupil of the relay optical system. As for the pupil, there are the pupil 193 of the relay optical system and the eye point 191 on either side of the image plane. In FIG. 7, C represents the principal ray of the beam of the center field angle emitted from the center of the image display surface 195 to reach the eye point 191, and A, B principal rays of off-axial beams with respective angles α, β relative to the principal ray C at the eye point 191. To correct the distortion, the optical system 192 should be arranged to satisfy the above stigmatic relation at the eye point 191 and the pupil 193 of the relay optical system and to make the principal rays of any field angles focused at the pupil 193 and the eye point 191 rotation-symmetrical wherein the principal ray C of the center field angle is defined as center of the rotation-symmetry. It is also preferred as to the correction of distortion that the following formula hold in the above image-forming of pupil.

$$\tan\beta/\tan\alpha = \tan\beta'/\tan\alpha'$$

where α: an angle which the off-axial principal ray A makes at the eye point with the principal ray C of the center field angle;

β: an angle which the off-axial principal ray B makes at the eye point with the principal ray C of the center field angle;

α': an angle which the off-axial principal ray A makes at the pupil position of the relay optical system with the principal ray C of the center field angle;

β': an angle which the off-axial principal ray B makes at the pupil position of the relay optical system with the principal ray C of the center field angle. If the optical system 192 related to the image-forming of pupil is arranged to satisfy this relation for all field angles, it can be said that a distortion is corrected in the optical system 192. The optical system 192 in FIG. 7 corresponds to the optical system composed of the reflective surfaces 14, 13 and a part of the relay optical system 12 in order from the eye point in FIG. 6. To correct the distortion, the above relation of pupil image formation needs to hold at the pupil of relay optical system 12 and the eye point 15 in FIG. 6. For correcting the decentering aberration generated by the reflective surface 14, it is effective to cancel it by another decentered system together with other aberrations than the distortion. In the present invention, the convex, reflective surface 13 is arranged as decentered in order to correct the decentering aberration generated by the concave, reflective surface 14. However, because incident angles and reflection angles on the reflective surface 14 are greatly different from each other in the 10 horizontal direction when the reflective surface 14 is observed from the eye point 15, the image-forming of pupil related to the above distortion correction cannot be good if both the concave, reflective surface 14 and convex, reflective surface 13 are spherical. For the distortion correction, the shape of convex, reflective surface 13 and concave, reflective surface 14 needs to be determined so that principal rays of beams outgoing from the relay optical system 12 are incident at set field angles into the eye point 15. In order to guide the principal rays in such a manner over the all field angles. Either one of the convex, reflective surface 13 and the concave, reflective surface 14 must include a rotationally asymmetric, aspherical surface. In the present invention either one of the concave, reflective surface and the convex, reflective surface is made of an asymmetric, aspherical system having no rotation symmetry axis, whereby the principal rays at respective field angles are guided to the eye point in a rotationally symmetric manner with respect to the principal ray of the axial beam, thereby correcting the asymmetric distortion. The use of the aspherical, reflective surface having no rotation symmetry axis is especially effective to correction of decentering distortion with less optical elements. This property is very important for optical systems particularly for displaying same images for binocular vision or stereoscopic images, in which a difference in distortion between left and right images owing to the distortion needs to be controlled as small as possible.

In order to correct the coma and the curvature of field together with the distortion, it is necessary that the image formation of skew rays other than the principal rays be good at the eye point 191 and the pupil 193 of the relay optical system in FIG. 7. For this purpose, it is effective to set an optical element having a diverging effect between the pupil 15 at the eye point and the pupil of relay optical system 12 in FIG. 6 in order to correct aberrations generated by an optical element having a converging effect. Here, the optical element may be either a lens or a reflective surface. For example, if a triplet is set between the eye point 15 and the pupil of relay optical system 12 in FIG. 6, the aberrations can be corrected for any field angles with a small number of optical elements while keeping the field angle wide. In order to keep the optical system along the observer's head, at least the first and second optical elements from the observer's pupil need to be reflective surfaces. Accordingly, the image display apparatus of the present invention is so arranged that there are the concave, reflective surface, the convex, reflective surface, and an optical element having a positive power arranged in order from the observer's pupil and that the pupil conjugate with the eye point is provided on the image display surface side with respect to the optical element having the positive power. This structure has an effect of aberration correction for aberrations other than the distortion. In particular, because a value of Petzval's sum can be set small by the triplet structure, the curvature of field is well corrected. However, if the shape of the reflective surface is determined particularly mainly for correcting the above distortion, correction shortage occurs for coma in the triplet structure when the field angle is wide. Thus, in order to correct the decentering coma of correction shortage, a partial optical system in the relay optical system 12 or the entire relay optical system 12 is provided with tilt and/or shift components in the present invention, thereby correcting the coma by a decentering effect.

Also, the decentration of reflective surfaces 13, 14 causes a decentering astigmatism. This can be corrected by determining the shape of reflective surfaces 13, 14 so as to change the curvature depending upon the radiation direction from the point where the principal ray of the center field angle is reflected. Namely, arranging the reflective surface in a shape having no rotation symmetry axis and setting the curvature thereof depending upon the radiation direction, it becomes possible to control meridional and sagittal components in a beam independently of each other. In the present invention, the decentering astigmatism is corrected by so setting the shape of reflective surfaces 13, 14. To be compatible with the distortion correction as described previously, it is effective to construct both the reflective surfaces 13, 14 of a rotationally asymmetric, aspherical surface having no rotation symmetry axis.

If the reflective surface 13 is a rotationally asymmetric, aspherical surface, it is preferable that the principal rays be substantially parallel with each other throughout all field angles as to beams directed from the relay optical system 12 to the reflective surface 13. If the principal rays of respective field angles directed from the relay optical system 12 to the reflective surface 13 are incident in a converging state onto the reflective surface 13, the beams of respective field angles are reflected densely on the reflective surface 13. Thus, when the reflective surface 13 is formed of a rotationally asymmetric, aspherical surface, it becomes difficult to correct the distortion, curvature of field, and astigmatism generated by the reflective surface 14 at all field angles. It is thus preferred as to the aberration correction that the reflective surface 13 have some reflection area.

In contrast, if the principal rays of respective field angles directed from the relay optical system 12 to the reflective surface 13 are incident divergingly onto the reflective surface 13, the size of the entire apparatus increases because the reflective surface 13 becomes larger. Thus, the present invention employs the arrangement that the principal rays of respective field angles coming from the relay optical system 12 onto the reflective surface 13 are substantially parallel, thereby achieving both the aberration correction and the size reduction.

Also, if the optical system between the eye point 15 and the pupil of the relay optical system 12 is the triplet structure only of a concave, reflective surface, a convex, reflective surface, and a concave, reflective surface and if the principal rays of respective field angles incident from the relay optical system 12 onto the reflective surface 13 are substantially parallel to each other, the concave, reflective surface on the pupil side, of the relay optical system 12 can be made of a paraboloid of revolution. Namely, the optical system on the eye point side from the pupil in the relay optical system 12 can be constructed of one reflective surface in the shape of paraboloid of revolution. If it is a paraboloid of revolution having a focus at the pupil position of the relay optical system, the optical system between the eye point 15 and the pupil of relay optical system 12 can be constructed only of reflective surfaces while keeping the above-described image-forming of pupil good, thus achieving a compact and light optical system. Also, the optical system can be produced at a low production cost because the rotationally symmetric, reflective surfaces can be used.

It should be noted that the convex, reflective surface 13 should be arranged so as not to interrupt beams directed from the concave, reflective surface 14 to the eye point. Thus, if the concave, reflective surface 14 is formed of an aspherical surface in which the curvature continuously decreases from point b where the off-axial beam B is reflected to point a where the off-axial beam A is reflected in FIG. 6, the distance between the reflective surfaces 13 and 14 can be made smaller between the reflective surfaces 13, 14, in the direction of the optical axis of the observer's pupil while achieving a wide field angle, thereby decreasing the size of the entire apparatus.

Figure 8:
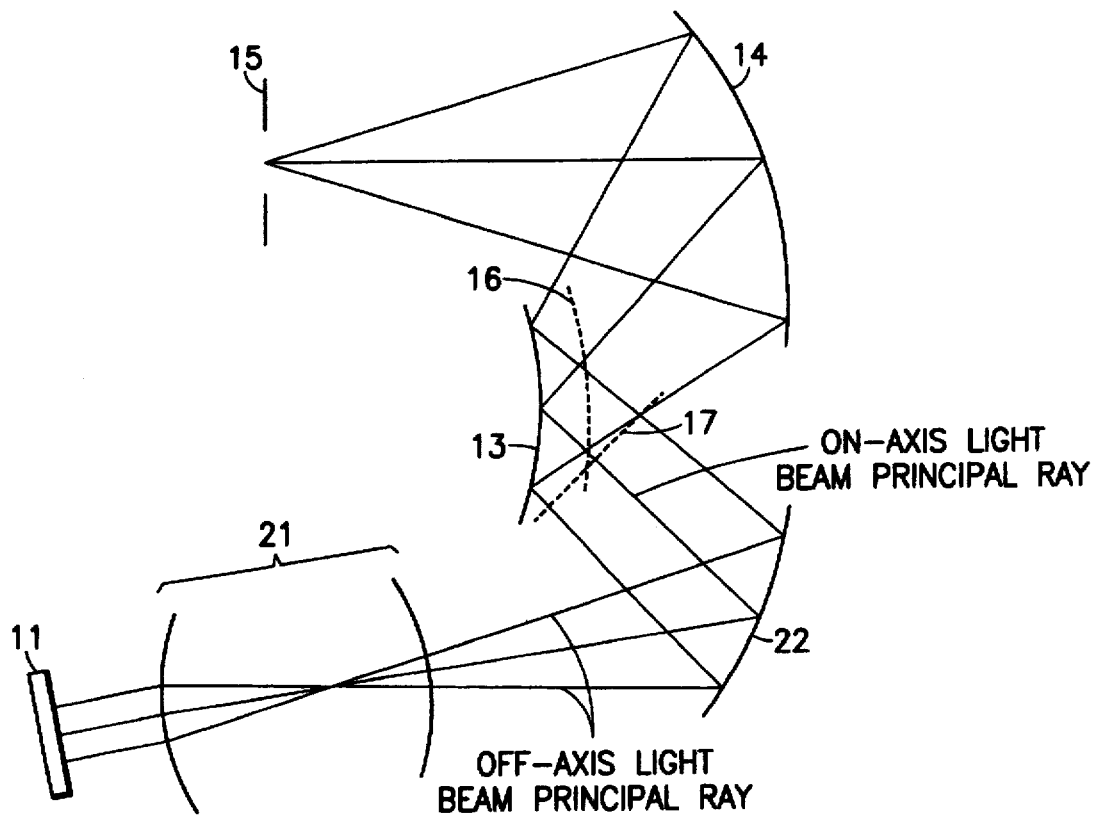
FIG. 8 is a schematic drawing to show the structure of an optical system in an image display apparatus of the present invention.
Figure 9:
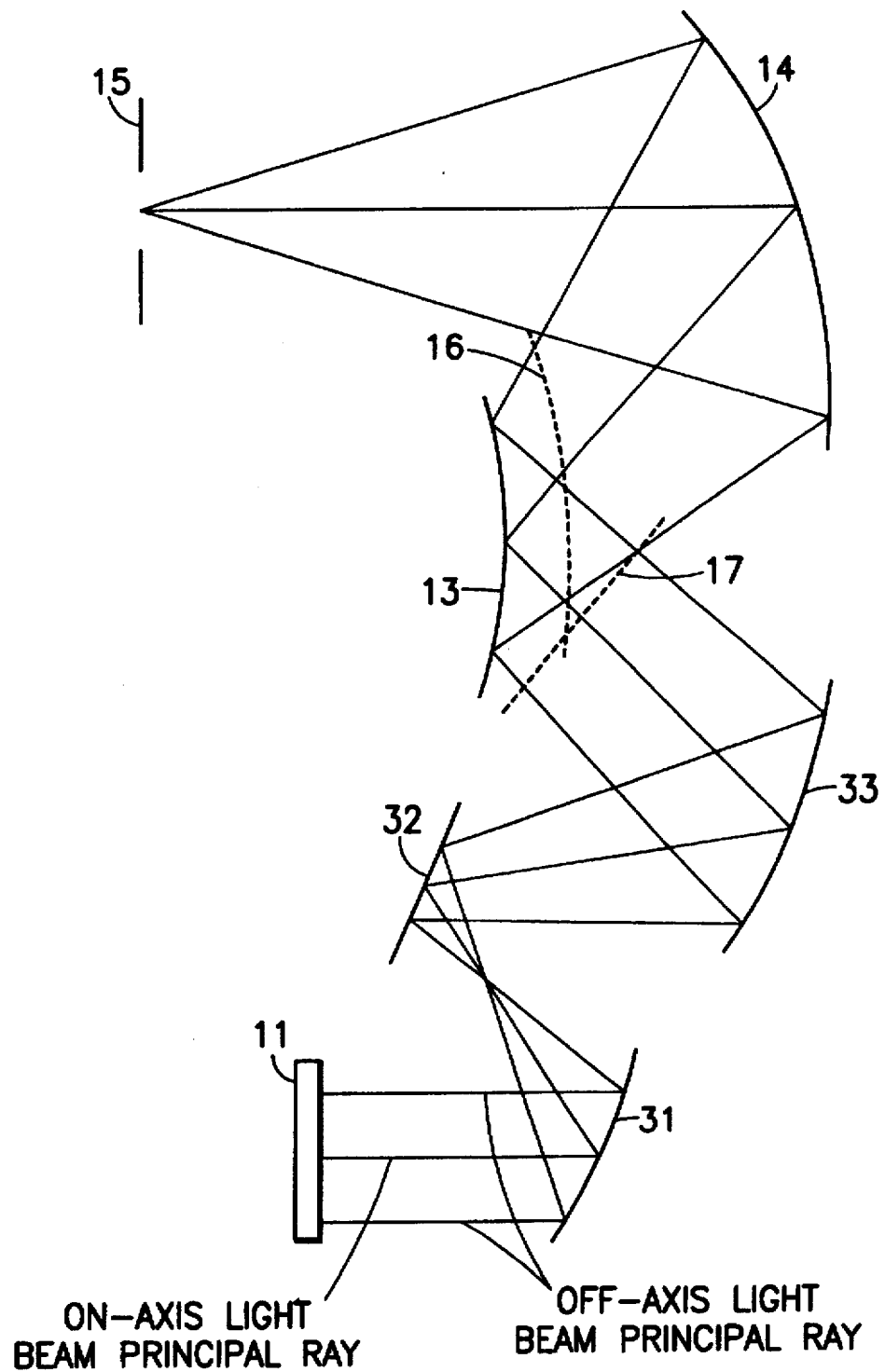
FIG. 9 is a schematic drawing to show the structure of an optical system in an image display apparatus of the present invention.

Meanwhile, the relay optical system 12 in FIG. 6 may be either a refracting system or a reflecting system. FIG. 8 shows the schematic structure in which the relay optical system 12 is replaced by a refracting optical system 21 and a concave, reflective surface 22. Also, FIG. 9 shows the schematic structure in which the relay optical system 12 is replaced by a concave, reflective surface 31, a convex, reflective surface 32, and a concave, reflective surface 33. Particularly, in order to correct the decentering coma which is not yet been corrected by the reflective surfaces 13, 14 as described previously, a part or all of the refracting optical system 21 and reflective surface 22 should be decentered in FIG. 8. Similarly, either or all of the reflective surfaces 31, 32, 33 should be decentered in FIG. 9. Further, the above decentering coma can be further corrected by employing a rotationally asymmetric, aspherical shape for reflective surface 22, 31, 32, 33. The coma generated by the decentered reflective surfaces 13, 14 is a rotationally asymmetric aberration about the center of virtual image. If a reflective surface in the relay optical system has a rotationally asymmetric shape differing in curvature depending upon the field angle, it can have a capability to correct the aberration. This arrangement can permit the decentering component of coma to be corrected by a small number of reflective surfaces, whereby the entire relay optical system can be constructed of a smaller number of lenses and/or reflective surfaces.

The structure of FIG. 8 is suitable for a size reduction, because the light beams can be led along the observer's head. And, the structure of FIG. 9 is compact and very light, because all optical elements can be reflective surfaces. In FIG. 8 a reflective surface replaces a part of the relay optical system in FIG. 6 while in FIG. 9 three reflective surfaces replace the entire relay optical system in FIG. 6, but the number of reflective surfaces is not limited to those in FIG. 8 and in FIG. 9.

Figure 10:
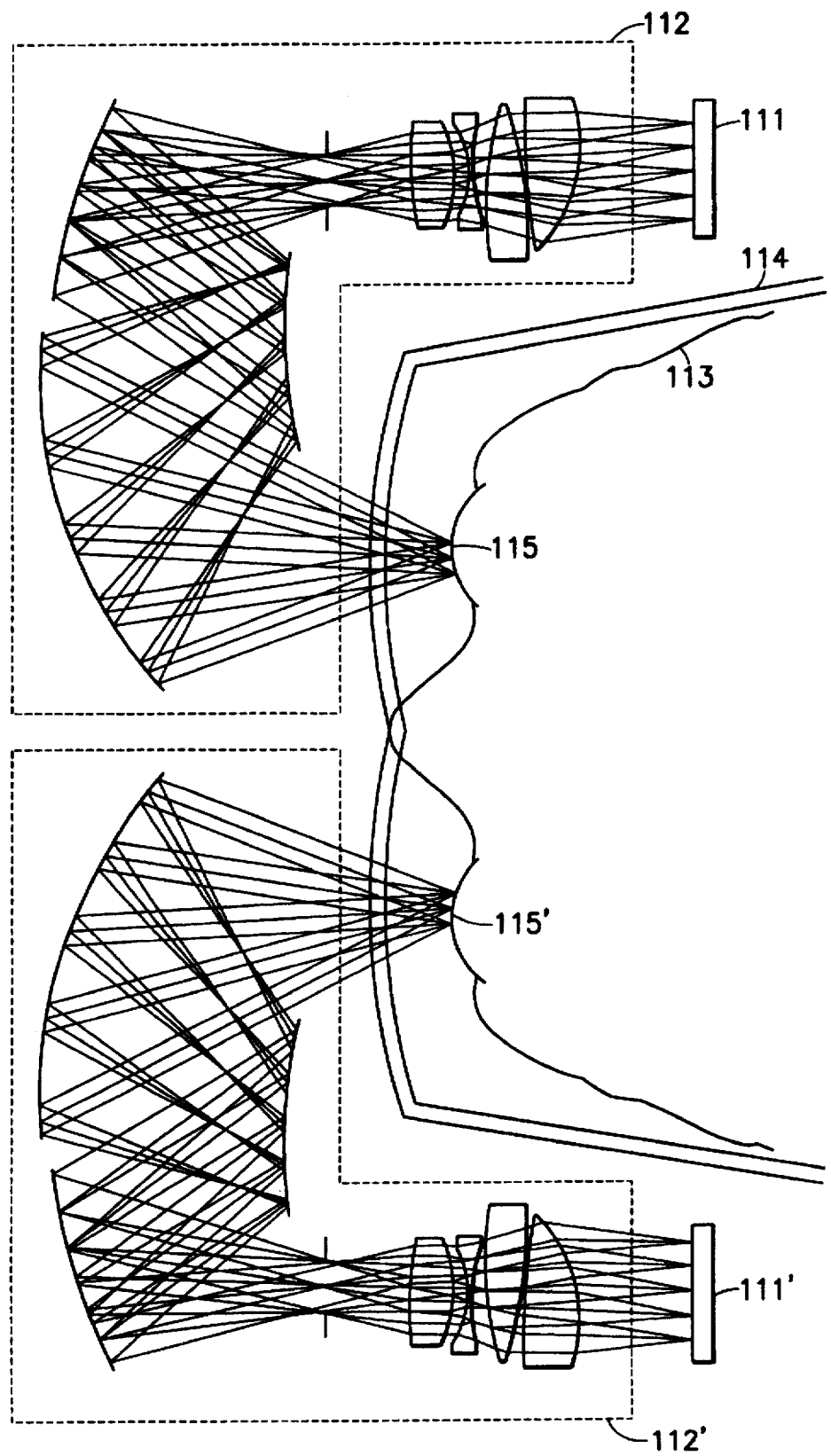
FIG. 10 is a drawing to show a structure in which two image display apparatus of the present invention are arranged in symmetry with each other.
Figure 13:
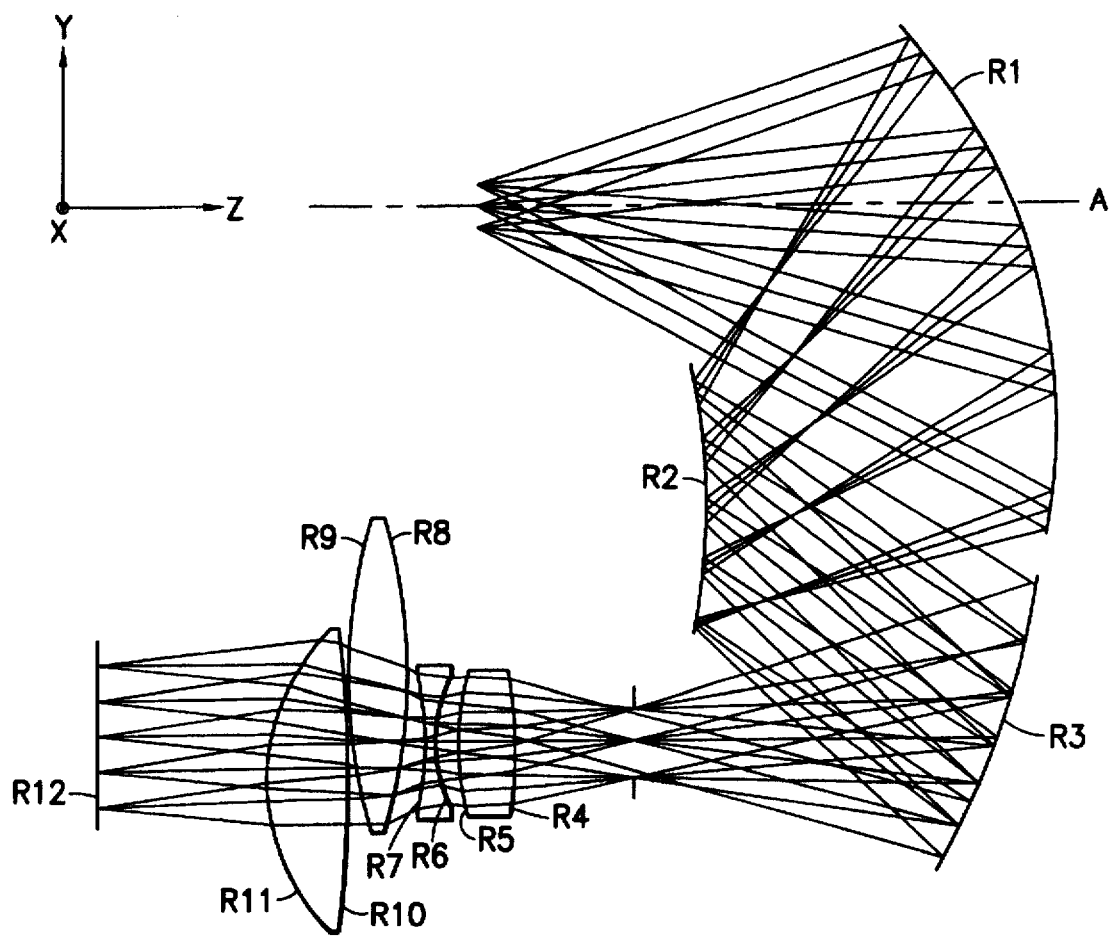
FIG. 13 is a cross-sectional view of an optical system in embodiment 3 of the present invention.
Figure 14:
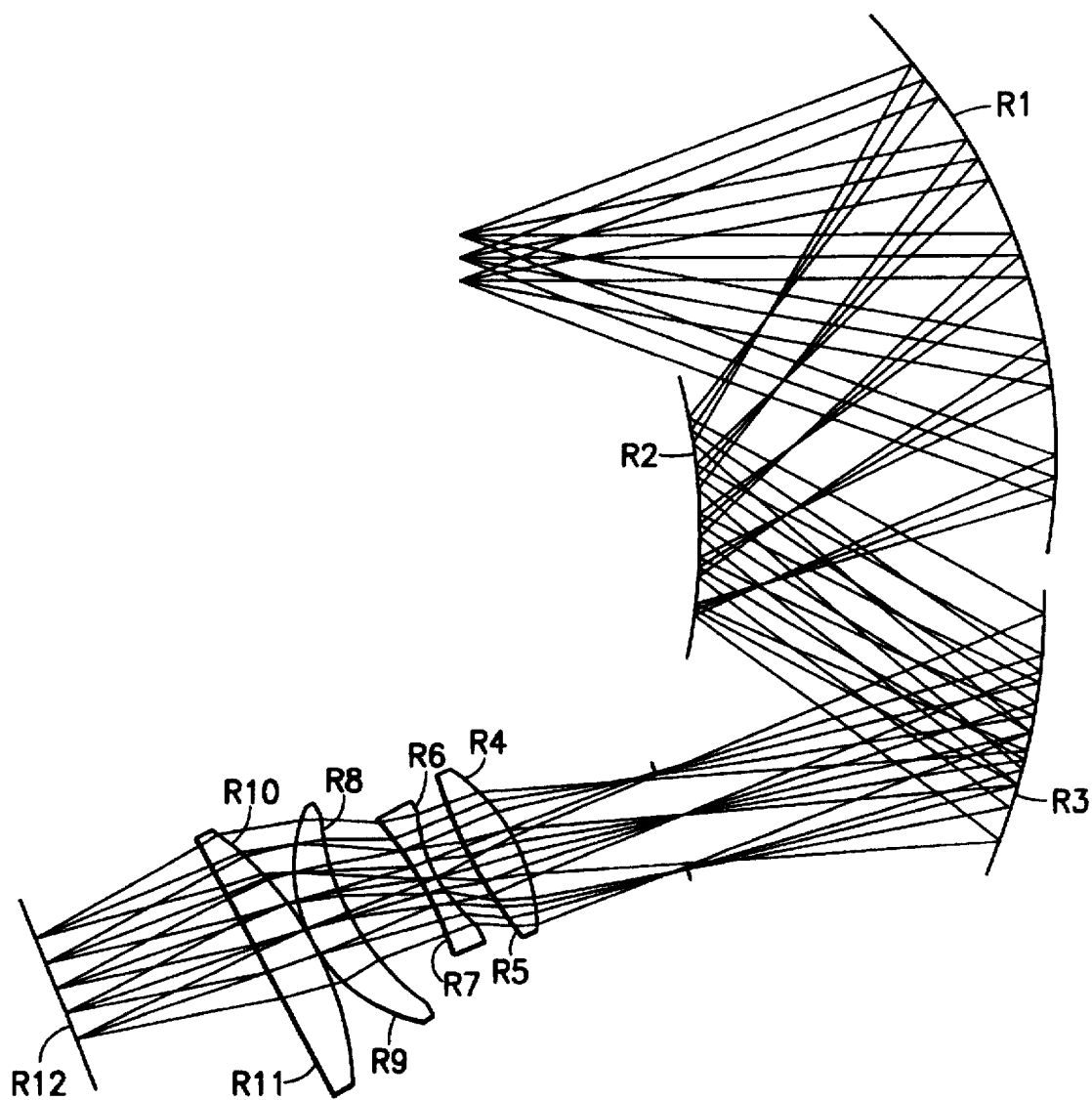
FIG. 14 is a cross-sectional view of an optical system in embodiment 4 of the present invention.
Figure 15:
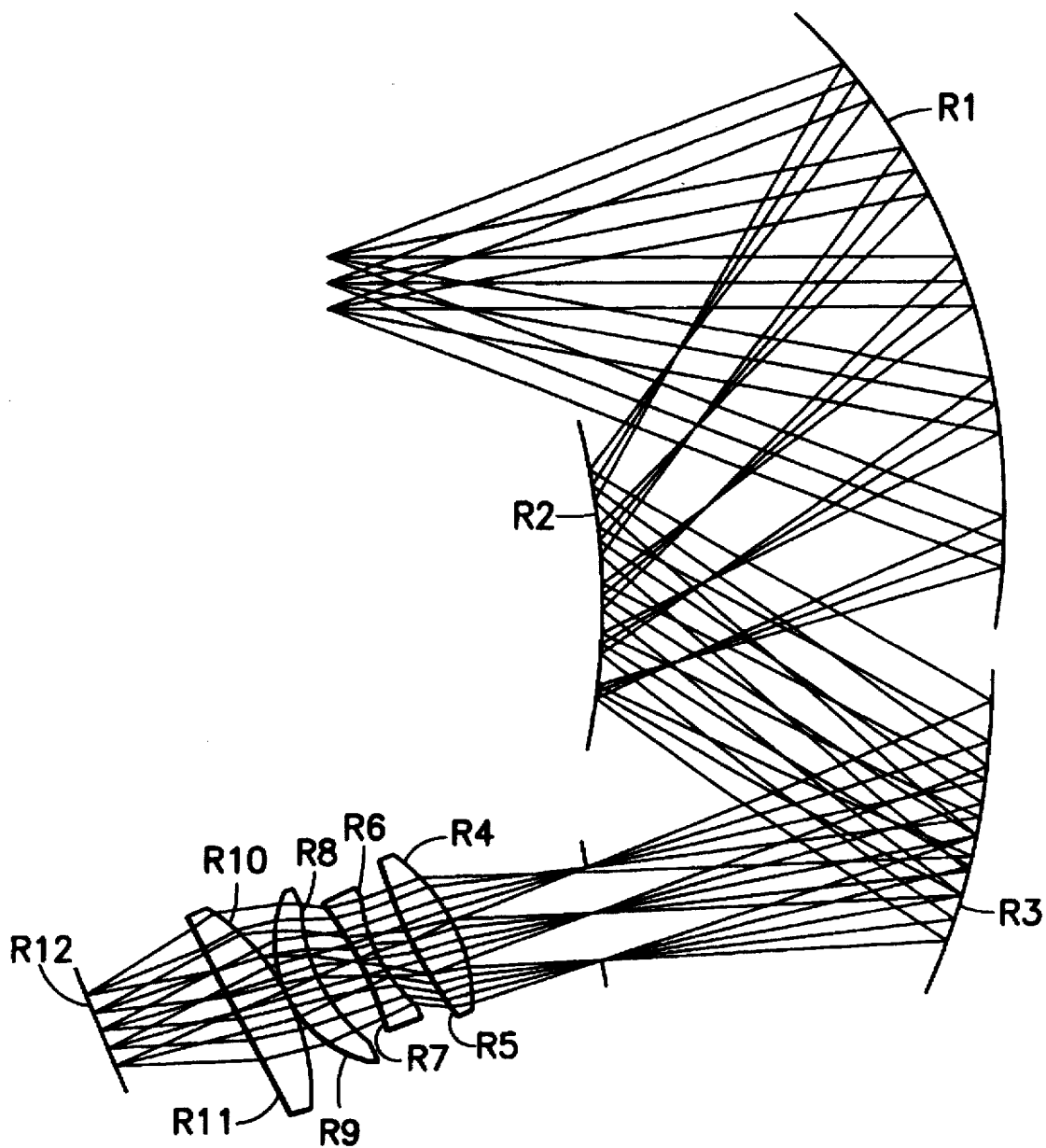
FIG. 15 is a cross-sectional view of an optical system in embodiment 5 of the present invention.
Figure 16:
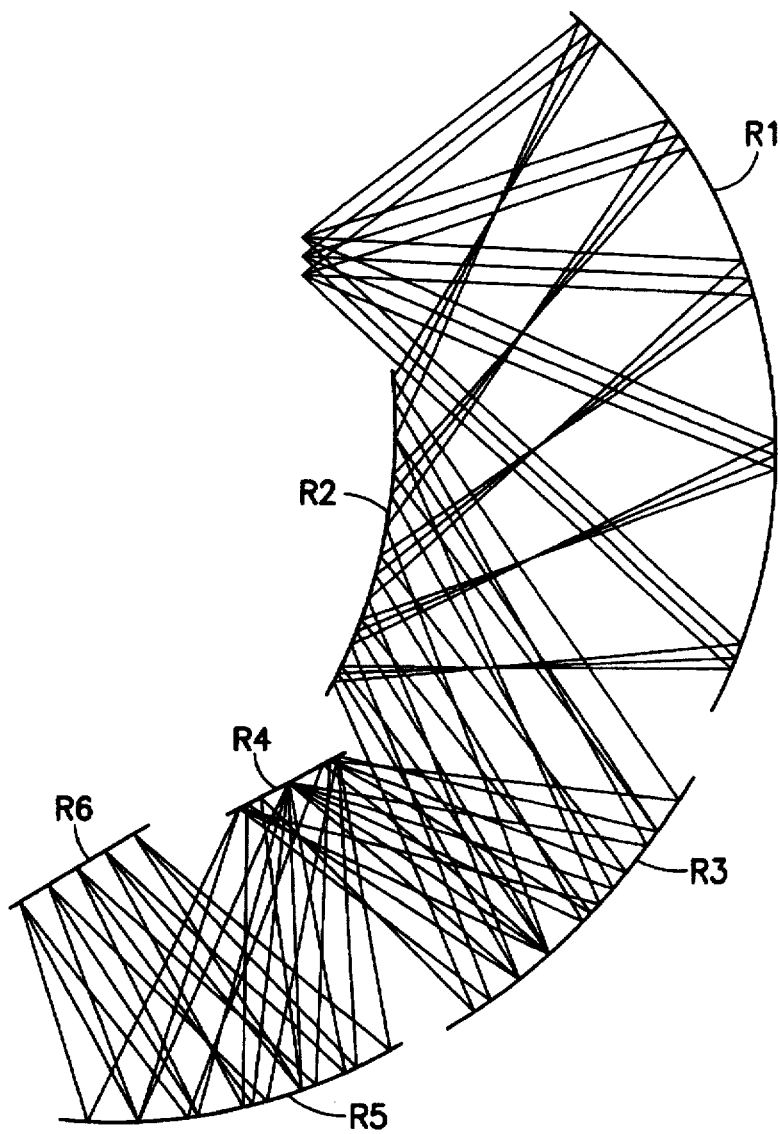
FIG. 16 is a cross-sectional view of an optical system in embodiment 6 of the present invention.

The image display apparatus of the present invention can be arranged as a display apparatus for binocular vision by setting two optical systems of same structure in symmetry with each other. FIG. 10 is a drawing to show a display apparatus in which two optical systems each for single eye are arranged in symmetry with each other. In FIG. 10, 111, 111' designate image display means, and 112, 112' observation optical systems each for guiding an image displayed on the image display means 111, 111', respectively, to the right eye 115 or to the left eye 115', respectively of the observer, which are set in symmetry by a frame not shown. Numeral 113 denotes the observer's head, and 114 eyeglasses which the observer is wearing. Employing such structure, the observer can see three-dimensional pictures when images with parallax are displayed on the image display means 111, 111'. Since the image display apparatus of the present invention can be long eye relief wherein a great spatial room exists in the direction of the optical axis of the observer's viewing direction at the eye point 15, by setting the first reflective surface from the observer's pupil in a decentered state, the apparatus can be a display apparatus which the observer can see with eyeglasses on as shown in FIG. 10.

Further, the image display apparatus of the present invention may be arranged in such a manner that the concave, reflective surface located first from the observer's pupil (the reflective surface 14 in FIG. 6, 8, or 9) is made of an optically transparent member and coated with a thin film coating made of a dielectric or a metal, etc. having appropriate transmittance and reflectivity, whereby a light beam from the external view ahead of the observer can also be guided to the eyes. Accordingly, such structure enables to superimpose the virtual image on the external view ahead of the observer, so that the observer can see the images at the same time. In addition, because the structure allows the observer to see the images with eyeglasses on, not only observers with healthy sight but also observers of myopia etc. can see both the display images and the external view clearly.

Figure 17:
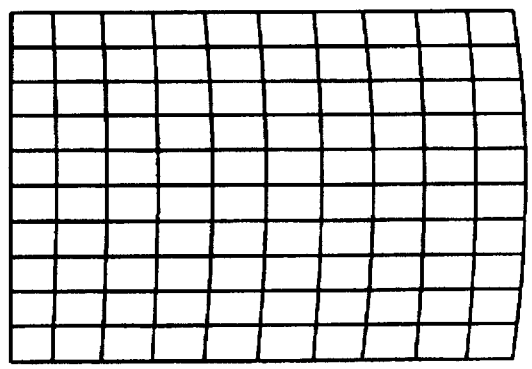
FIG. 17 is a drawing to show a distortion in embodiment 3 of the present invention.

Next, FIG. 11 to FIG. 16 show structures of embodiment 1 to embodiment 6, and numerical embodiments 1 to 6 will be presented corresponding to the numerals of the embodiments. Further, FIG. 17 shows a distortion result of numerical embodiment 3, and FIGS. 18A to 18I are aberration diagrams thereof.

Figure 19:
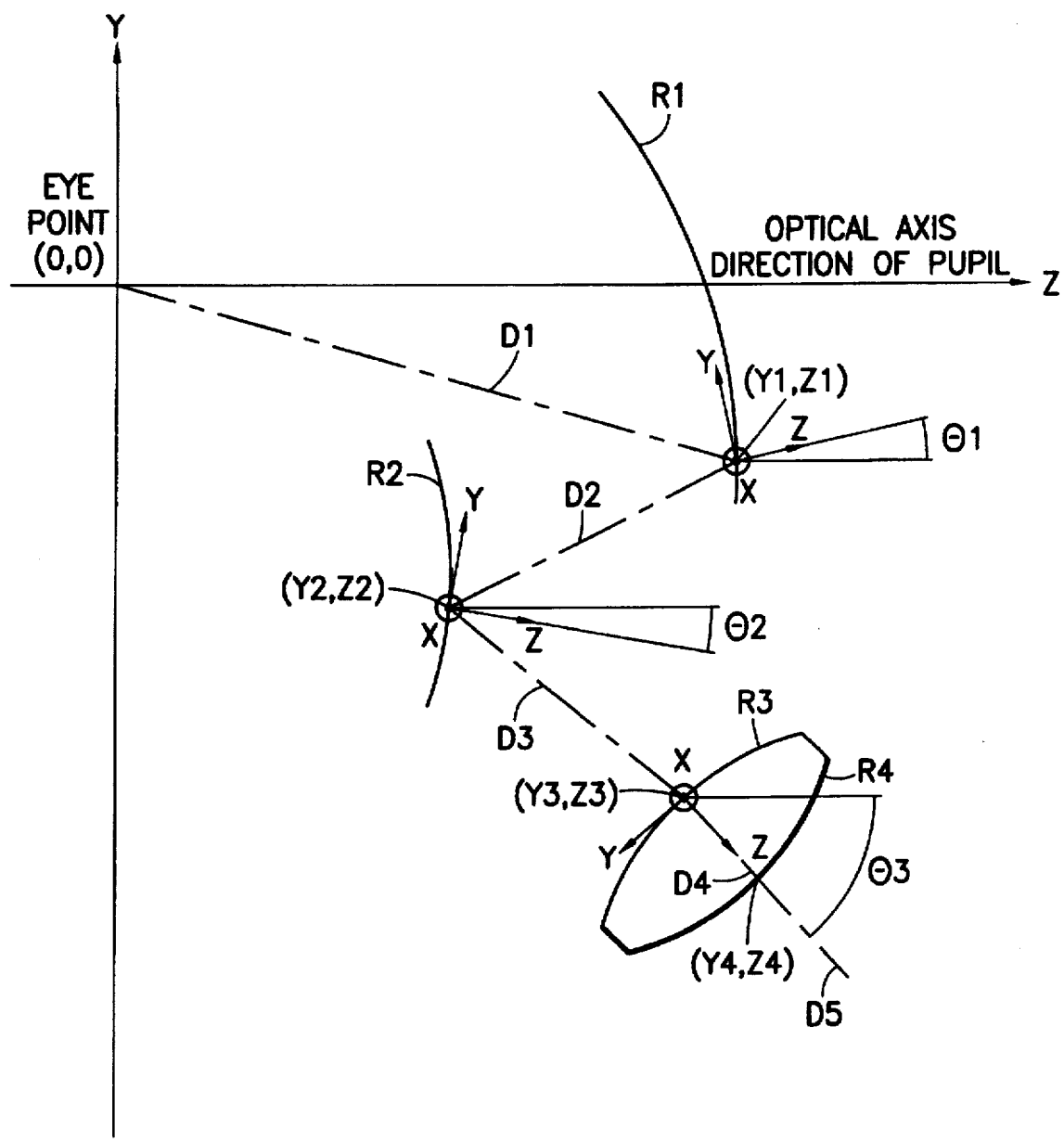
FIG. 19 is a drawing to show a coordinate system in the optical system in the image display apparatus of the present invention.

FIG. 19 is a drawing to show the coordinate system for positions and inclinations of refractive or reflective surfaces as optical elements. Coordinates of a vertex position of the i-th refractive or reflective surface in order of beam from the observer's pupil to the display surface are expressed by absolute coordinates (Yi, Zi) when the origin is taken at the eye point position where the observer's pupil is located (at a point of intersection between the principal rays of respective field angles). The axes of the absolute coordinate system are defined so that the Z axis is taken along the optical axis of the observer's viewing direction, the Y axis along the axis perpendicular to the Z axis as shown in FIG. 19, and the X axis along the direction perpendicular to Y and Z axes. Also, a tilt angle in the YZ plane, of the i-th refractive or reflective surface is expressed by an angle θi (in degrees), which is positive for counterclockwise rotation to the Z axis in the YZ plane. It is assumed that a local origin of each optical element is on the YZ plane and that the respective optical elements have no tilt in the XZ plane and in the XY plane. Further, Ri represents a radius of curvature of the i-th optical element from the observer's pupil to the display surface, Di a thickness of the i-th lens or an air separation, and Ni, vi a refractive index and an Abbe's number of the i-th optical element. The signs of Ri are determined as negative when the center of curvature is located on the observer's pupil side along the optical axis from the observer's pupil to the display surface, while as positive when it is on the display surface side.

The image display apparatus of the present invention has at least one concave, reflective surface and one convex, reflective surface, the shape of which is defined by the following equation.

$$z=\{(x^2+y^2)/R\}/\{1+(1-(1+A)(x^2+y^2)/R^2)^{1/2}\}+Bx^6+Cx^4y^2+Dx^4y+Ex^4+Fx^2y^4+Gx^2y^3+Hx^2y^2+Ix^2y+Jx^2+Ky^6+Ly^5+My^4+Ny^3+Oy^2+Py+Q$$

Here, the coordinates (x, y, z) in the above equation for curved surface are taken in a local coordinate system with the origin at coordinates (Yi, Zi) of each reflective surface, and the respective axes are defined as follows.

z: a coordinate axis of reflective surface making a tilt angle θi in the counterclockwise direction in the YZ plane with respect to the Z direction, with the origin at coordinates (Yi, Zi) of reflective surface.

y: a coordinate axis making 90° in the counterclockwise direction in the YZ plane with respect to the z direction, with the origin at coordinates (Yi, Zi) of reflective surface.

x: a coordinate axis perpendicular to the YZ plane, with the origin at coordinates (Yi, Zi) of reflective surface.

Since the above equation for curved surface includes only even terms of x, so that the equation takes a same value for a same absolute value of x coordinates and a same y coordinate value. Accordingly, curved surfaces defined by the above equation for curved surface are in plane symmetry with respect to the YZ plane as a symmetry plane. The above equation for curved surface is a Zernike polynomial expansion to degree 6 as arranged with x and y terms for z.

| [Numerical Embodiment 1] | | | | | | | |
|---|---|---|---|---|---|---|---|
| i | (Yi, | Zi) | θi | Ri | Di | Ni | vi |
|  | (0.00, | 0.00) | 0.000 |  | 88.89 | 1 |  | eye point |
| 1 | (−39.84, | 79.46) | 0.000 | −78.513 | 46.50 | 1 |  | reflective surface |
| 2 | (−39.84, | 32.96) | 0.000 | 72.068 | 53.00 | 1 |  | reflective surface |
| 3 | (−67.84, | 77.96) | −40.589 | 86.218 | 5.00 | 1.77250 | 49.6 |
| 4 | (−71.09, | 81.76) | −40.589 | −318.410 | 0.20 | 1 |  |
| 5 | (−71.22, | 81.91) | −40.589 | 51.186 | 4.00 | 1.77250 | 49.6 |
| 6 | (−73.82, | 84.94) | −40.589 | 121.299 | 66.07 | 1 |  |
| 7 | (−117.17, | 134.81) | −32.802 | −45.660 | 2.00 | 1.84866 | 23.8 |
| 8 | (−118.25, | 136.49) | −32.802 | −177.225 | 7.00 | 1.88300 | 40.8 |
| 9 | (−122.04, | 142.37) | −32.802 | −32.637 | 0.20 | 1 |  |
| 10 | (−122.15, | 142.54) | −32.802 | 36.595 | 6.00 | 1.83481 | 42.7 |
| 11 | (−125.40, | 147.59) | −32.802 | ∞ | 20.77 | 1 |  |
| 12 | (−137.11, | 164.74) | −46.389 | ∞ |  |  |  | display surface |

Shape of reflective surface

R1 surface

| A = −4.97700e-1 | B = −1.89756e-11 | C = 5.37337e-11 |
| D = −1.00081e-9 | E = −1.41938e-7 | F = 3.88162e-11 |
| G = −1.00498e-8 | H = 6.49601e-7 | I = −1.93714e-5 |
| J = 7.60150e-4 | K = 2.8469e-12 | L = −2.80278e-9 |
| M = 2.36659e-7 | N = −5.64565e-6 | O = 1.24770e-3 |
| P = 7.22268e-2 | Q = −5.02001e-4 | |

R2 surface

| A = −9.50069e-1 | B = 1.97240e-8 | C = 3.96597e-8 |
| D = 1.66650e-8 | E = −1.87379e-6 | F = −5.27983e-9 |
| G = −9.26486e-9 | H = 1.96450e-6 | I = 4.19371e-6 |
| J = −1.38759e-2 | K = −2.25565e-9 | L = 8.78439e-8 |
| M = −3.62800e-7 | N = 9.72829e-6 | O = 3.22332e-3 |
| P = 2.95105e-2 | Q = −2.66203e-4 | |

Dimensions of display surface: horizontal length 12.24 mm; vertical length 10.8 mm
Field angle: horizontal angle: 40.0°; vertical angle 30.4°
Diopter: −1 diopter

| [Numerical Embodiment 2] | | | | | | | |
|---|---|---|---|---|---|---|---|
| i | (Yi, | Zi) | θi | Ri | Di | Ni | vi |
|  | (0.00, | 0.00) | 0.000 |  | 88.89 | 1 |  | eye point |
| 1 | (−39.84, | 79.46) | 0.000 | −81.461 | 46.50 | 1 |  | reflective surface |
| 2 | (−39.84, | 32.96) | 0.000 | 111.277 | 183.07 | 1 |  | reflective surface |
| 3 | (−142.54, | 184.51) | −40.000 | 58.681 | 7.00 | 1.80400 | 46.6 |
| 4 | (−147.04, | 189.87) | −40.000 | 2034.482 | 5.00 | 1 |  |
| 5 | (−150.26, | 193.70) | −40.000 | 263.591 | 2.00 | 1.84666 | 23.8 |
| 6 | (−151.54, | 195.23) | −40.000 | 37.971 | 5.00 | 1 |  |
| 7 | (−154.76, | 199.06) | −40.000 | 49.977 | 9.00 | 1.83481 | 42.7 |

-continued

| | | | | | | | |
|---|---|---|---|---|---|---|---|
| 8 | (−160.54, | 205.96) | −40.000 | −342.490 | 99.47 | 1 | display surface |
| 9 | (−218.10, | 287.09) | −44.833 | ∞ | | | |

Shape of reflective surface

R1 surface

A = −4.68189e-1   B = −6.02639e-12   C = −8.16265e-8
D = −9.65076e-11  E = 3.17367e-9    F = 1.88451e-11
G = −8.44109e-9   H = 6.77986e-7    I = −9.98813e-6
J = −1.22758e-2   K = 4.28475e-13   L = −2.46509e-9
M = 3.43505e-7    N = −1.62053e-4   O = 1.20883e-3
P = 9.98288e-2    Q = −1.69515e-4

R2 surface

A = −7.94537e-1   B = 1.91361e-8    C = −3.38459e-6
D = 2.71507e-8    E = −3.90011e-7   F = 8.04369e-9
G = −3.68482e-7   H = −9.41534e-8   I = 2.15325e-4
J = −8.98661e-3   K = −1.39624e-9   L = 1.26226e-9
M = 1.64311e-6    N = 2.55660e-5    O = 4.60765e-4
P = 1.56454e-2    Q = −5.39592e-4

Dimensions of display surface:  horizontal length  14.24 mm;
                                vertical length    10.8 mm
Field angle:                    horizontal angle   40.0°;
                                vertical angle     30.4°
Diopter:                        −1 diopter

[Numerical Embodiment 3]

| i | (Yi, Zi) | θi | Ri | Di | Ni | νi | |
|---|---|---|---|---|---|---|---|
|   | (0.00, 0.00) | 0.000 |  | 90.92 | 1 |  | eye point |
| 1 | (−44.18, 79.46) | 0.000 | −80.339 | 46.50 | 1 |  | reflective surface |
| 2 | (−44.18, 32.96) | 0.000 | 74.522 | 45.85 | 1 |  | reflective surface |
| 3 | (−35.42, 77.96) | 0.000 | −95.194 | 80.68 | 1 |  | reflective surface |
| 4 | (−75.40, 7.88) | 2.000 | 74.787 | 8.00 | 1.87400 | 35.3 | |
| 5 | (−75.67, −0.11) | 2.000 | −29.307 | 3.00 | 1 | | |
| 6 | (−75.78, −3.11) | 2.000 | −18.741 | 1.00 | 1.84666 | 23.9 | |
| 7 | (−75.81, −4.11) | 2.000 | 38.922 | 9.69 | 1 | | |
| 8 | (−66.40, −6.44) | 2.000 | 67.526 | 8.27 | 1.68600 | 49.1 | |
| 9 | (−66.69, −14.71) | 2.000 | −72.146 | 15.17 | 1 | | |
| 10 | (−81.85, −14.28) | 2.000 | 277.692 | 10.74 | 1.71700 | 47.9 | |
| 11 | (−82.23, −25.02) | 2.000 | −30.312 | 23.28 | 1 | | |
| 12 | (−76.94, −47.69) | 2.000 | ∞ |  |  |  | display surface |

Shape of reflective surface

R1 surface

A = −5.21188e-1   B = −6.02639e-12  C = −9.65076e-11
D = 3.11617e-9    E = −2.94976e-7   F = 1.88451e-11
G = −8.55609e-9   H = 3.00859e-7    I = −4.44186e-7
J = −1.24473e-2   K = 4.28475e-13   L = −2.52259e-9
M = 2.13669e-7    N = −3.46207e-6   O = 8.69099e-4
P = 1.00002e-1    Q = −8.63262e-5

R2 surface

A = −4.70789      B = 1.91361e-8    C = 2.71507e-8
D = −3.85638e-7   E = 4.71476e-6    F = 8.04369e-9
G = −3.59736e-7   H = −2.00183e-6   I = 2.11507e-4
J = −6.80185e-3   K = −1.39624e-9   L = 5.63525e-9
M = −1.15738e-6   N = 4.37346e-5    O = 1.54360e-3
P = −2.00571e-2   Q = 1.31420e-3

R3 surface

A = 5.73332e-1    B = 1.11491e-10   C = 3.44512e-10
D = −3.53792e-9   E = −1.86565e-7   F = 2.40857e-10
G = 3.51796e-9    H = −7.92643e-7   I = −4.24572e-5
J = −1.05048e-2   K = 1.27200e-10   L = 6.05701e-9
M = −5.58030e-7   N = −7.77571e-5   O = −2.15282e-3
P = −8.57813e-2   Q = 7.26470e-4

Dimensions of display surface   horizontal length  17.43 mm;
                                vertical length    10.8 mm
Field angle:                    horizontal angle   48.0° (−20° to +28°);
                                vertical angle     30.4°
Diopter:                        −1 diopter -continued

[Numerical Embodiment 4]

| i | (Yi, | Zi) | θi | Ri | Di | Ni | vi | |
|---|---|---|---|---|---|---|---|---|
|   | (0.00, | 0.00) | 0.000 |  | 87.93 | 1 |  | eye point |
| 1 | (−37.65, | 79.46) | 0.000 | −79.175 | 46.50 | 1 |  | reflective surface |
| 2 | (−37.65, | 32.96) | 0.000 | 76.712 | 46.10 | 1 |  | reflective surface |
| 3 | (−27.65, | 77.96) | −10.000 | −108.497 | 86.59 | 1 |  | reflective surface |
| 4 | (−79.42, | 8.55) | −28.303 | 31.675 | 6.00 | 1.83481 | 42.7 |  |
| 5 | (−82.27, | 3.27) | −28.303 | −87.653 | 5.40 | 1 |  |  |
| 6 | (−84.83, | −1.48) | −28.303 | −23.847 | 2.00 | 1.84666 | 23.8 |  |
| 7 | (−85.78, | −3.25) | −28.303 | 62.025 | 10.00 | 1 |  |  |
| 8 | (−90.52, | −12.05) | −28.303 | −36.782 | 6.00 | 1.72000 | 50.2 |  |
| 9 | (−93.36, | −17.33) | −28.303 | −21.880 | 0.10 | 1 |  |  |
| 10 | (−93.41, | −17.42) | −28.303 | 47.481 | 7.00 | 1.77250 | 49.6 |  |
| 11 | (−96.73, | −23.58) | −28.303 | ∞ | 27.02 | 1 |  |  |
| 12 | (−99.79, | −50.43) | −23.431 | ∞ |  |  |  | display surface |

Shape of reflective surface

R1 surface

A = −3.60944e-1    B = −6.02639e-12    C = −9.65076e-11
D = 3.17367e-9     E = −9.88050e-8     F = 1.88451e-11
G = −8.44109e-9    H = 5.51167e-7      I = −1.17067e-5
J = −2.98481e-4    K = 4.28475e-13     L = −2.46509e-9
M = 3.08678e-7     N = −1.10670e-5     O = 8.23911e-4
P = 9.42730e-2     Q = −1.31407e-4

R2 surface

A = −1.00021       B = 1.91361e-8      C = 2.71507e-8
D = −3.90011e-7    E = −3.57461e-6     F = 8.04369e-9
G = −3.68482e-7    H = 4.56014e-6      I = 1.25544e-4
J = −2.38079e-3    K = −1.39624e-9     L = 1.26226e-9
M = 5.04322e-7     N = 4.40768e-5      O = 3.09544e-4
P = −2.79478e-2    Q = 5.18003e-4

R3 surface

A = 1.01491e-1     B = 1.10510e-10     C = 3.48891e-10
D = −3.88348e-9    E = −3.43018e-7     F = 2.52871e-10
G = 3.69581e-9     H = −5.69017e-7     I = −7.53665e-6
J = 1.43992e-4     K = 1.23879e-10     L = 6.61113e-9
M = −6.78712e-7    N = −7.45099e-5     O = −1.75339e-3
P = 2.60470e-2     Q = 4.02502e-4

| | | |
|---|---|---|
| Dimensions of display surface: | horizontal length | 14.24 mm; |
| | vertical length | 10.8 mm |
| Field angle: | horizontal angle | 40.0°; |
| | vertical angle | 30.4° |
| Diopter: | −1 diopter | |

[Numerical Embodiment 5]

| i | (Yi, | Zi) | θi | Ri | Di | Ni | vi | |
|---|---|---|---|---|---|---|---|---|
|   | (0.00, | 0.00) | 0.000 |  | 88.89 | 1 |  | eye point |
| 1 | (−39.84, | 79.46) | 0.000 | 79.103 | 46.50 | 1 |  | reflective surface |
| 2 | (−39.84, | 32.96) | 0.000 | 78.761 | 46.10 | 1 |  | reflective surface |
| 3 | (−29.84, | 77.96) | −10.000 | −106.357 | 79.15 | 1 |  | reflective surface |
| 4 | (−79.54, | 16.36) | −27.145 | 24.047 | 5.00 | 1.83481 | 42.7 |  |
| 5 | (−81.82, | 11.91) | −27.145 | −101.824 | 4.55 | 1 |  |  |
| 6 | (−83.90, | 7.86) | −27.15 | −17.985 | 2.00 | 1.84666 | 23.8 |  |
| 7 | (−84.81, | 6.08) | −27.145 | 50.545 | 5.00 | 1 |  |  |
| 8 | (−87.09, | 1.64) | −27.145 | −31.076 | 4.20 | 1.74320 | 49.3 |  |
| 9 | (−89.01, | −2.10) | −27.145 | −15.851 | 0.10 | 1 |  |  |
| 10 | (−89.05, | −2.19) | −27.145 | 29.988 | 6.00 | 1.83481 | 42.7 |  |
| 11 | (−91.79, | −7.54) | −27.145 | ∞ | 16.24 | 1 |  |  |
| 12 | (−93.57, | −23.68) | −22.312 | ∞ |  |  |  | display surface |

Shape of reflective surface

R1 surface

A = −4.35616e-1    B = −6.02639e-12    C = −9.6076e-11
D = 3.17367e-9     E = −1.62031e-7     F = 1.88451e-11
G = −8.44109e-9    H = 5.22376e-7      I = −9.04325e-6
J = −1.26417e-2    K = 4.28475e-13     L = −2.46509e-9
M = 2.68299e-7     N = −7.96950e-6     O = 7.56131e-4
P = 9.77730e-2     Q = −1.26235e-4

R2 surface

A = −7.06381e-1    B = 1.91361e-8      C = 2.71507e-7
D = −3.90011e-7    E = −3.73945e-7     F = 8.04369e-9

-continued

| | | |
|---|---|---|
| G = −3.68482e-7 | H = 3.83217e-6 | I = 1.68412e-4 |
| J = −3.39833e-3 | K = −1.39624e-9 | L = 1.26226e-9 |
| M = 4.97620e-7 | N = 6.18053e-5 | O = 1.24588e-4 |
| P = −5.59646e-2 | Q = 8.18257e-4 | |

R3 surface

| | | |
|---|---|---|
| A = −5.24655e-2 | B = 1.10510e-10 | C = 3.48691e-10 |
| D = −3.88348e-9 | E = −2.87157e-7 | F = 2.52871e-10 |
| G = 3.69581e-9 | H = −7.61141e-7 | I = −1.05901e-5 |
| J = 1.09051e-4 | K = 1.23879e-10 | L = 6.61113e-9 |
| M = −7.81129e-7 | N = −7.80632e-5 | O = −1.65028e-3 |
| P = 2.05247e-2 | Q = 3.85473e-4 | |

| | | |
|---|---|---|
| Dimensions of display surface: | horizontal length | 9.0 mm; |
| | vertical length | 7.20 mm |
| Field angle: | horizontal angle | 40.0°; |
| | vertical angle | 30.4° |
| Diopter: | −1 diopter | |

[Numerical Embodiment 6]

| i | (Yi, Zi) | θi | Ri | Di | Ni | vi |
|---|---|---|---|---|---|---|
|   | (0.00, 0.00) | 0.000 | ∞ | 74.89 | 1 | eye point |
| 1 | (−29.49, 68.84) | 0.000 | −84.090 | 53.84 | 1 | reflective surface |
| 2 | (−30.00, 15.00) | 0.000 | 150.000 | 62.59 | 1 | reflective surface |
| 3 | (−74.67, 58.84) | −25.000 | −103.185 | 55.90 | 1 | reflective surface |
| 4 | (−76.20, 2.96) | −55.000 | 107.602 | 40.00 | 1 | reflective surface |
| 5 | (−108.97, 25.90) | −55.000 | −85.072 | 54.64 | 1 | display surface |
| 6 | (−89.88, −25.30) | −55.000 | ∞ | | | |

Shape of reflective surface

R1 surface

| | | |
|---|---|---|
| A = 0.23430 | B = 0.00000 | C = 0.00000 |
| D = 0.00000 | E = 0.00000 | F = 0.00000 |
| G = 0.00000 | H = 0.00000 | I = 0.00000 |
| J = 0.00000 | K = 0.00000 | L = 0.00000 |
| M = 0.00000 | N = 0.00000 | O = 0.00000 |
| P = 0.00000 | Q = 0.00000 | |

R2 surface

| | | |
|---|---|---|
| A = −4.52160e-8 | B = −1.06814e-9 | C = −3.70342e-9 |
| D = 1.83686e-9 | E = 1.36596e-7 | F = −8.42828e-12 |
| G = 6.16248e-9 | H = −2.05925e-6 | I = −9.28818e-6 |
| J = 8.89067e-4 | K = −1.55933e-9 | L = −2.28529e-9 |
| M = 5.54034e-7 | N = 4.09889e-5 | O = −8.89068e-4 |
| P = −7.44530e-4 | Q = 5.54569e-11 | |

R3 surface

| | | |
|---|---|---|
| A = −9.09049e-1 | B = −1.63020e-10 | C = 7.19519e-11 |
| D = 1.02286e-9 | E = −7.38159e-8 | F = 6.88591e-10 |
| G = 5.13344e-8 | H = 4.74920e-7 | I = 1.35358e-5 |
| J = 2.13475e-4 | K = 2.02786e-12 | L = −5.79580e-11 |
| M = −5.06174e-7 | N = −6.07897e-6 | O = 1.17543e-4 |
| P = 4.24633e-2 | Q = −8.27018e-5 | |

R4 surface

| | | |
|---|---|---|
| A = 1.87027e1 | B − 4.57264e-8 | C = 1.79507e-7 |
| D = 2.23958e-6 | E = 1.27216e-7 | F = 9.80710e-8 |
| G = 1.29229e-6 | H = −1.24793e-5 | I = 3.26211e-5 |
| J = 7.18153e-5 | K = 2.93572e-9 | L = 1.77889e-7 |
| M = −1.54155e-6 | N = 4.05178e-5 | O = 1.51518e-4 |
| P = 5.83868e-2 | Q = −5.51446e-5 | |

R5 surface

| | | |
|---|---|---|
| A = 4.73527e-2 | B = −6.30419e-11 | C = 3.26362e-10 |
| D = −1.39985e-9 | E = 1.04029e-8 | F = −4.91997e-10 |
| G = 4.16989e-9 | H = 4.47815e-7 | I = −1.12698e-5 |
| J = −2.01123e-3 | K = −1.19013e-10 | L = −2.51780e-9 |
| M = 3.14568e-7 | N = 1.45241e-5 | O = −4.28967e-4 |
| P = −8.18068e-2 | Q = 6.09989e-4 | |

| | | |
|---|---|---|
| Dimensions of display surface: | horizontal length | 14.24 mm; |
| | vertical length | 10.8 mm |
| Field angle | horizontal angle | 80.0°; |
| | vertical angle | 64.00° |
| Diopter | −1 diopter | |

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An image display apparatus comprising:

image display means for emitting a light beam to display an image; and an observation optical system for guiding the light beam from said image display means to the pupil of an observer, said observation optical system having at least a concave-reflective surface, a convex-reflective surface and a relay optical system in order from a pupil side of said observer along an optical axis of the light beam directed from said image display means to said pupil, said concave-reflective surface being located near said pupil, wherein said relay optical system forms an aerial image of said display image near said convex-reflective surface, and an image of pupil of said relay optical system is formed at a position of the pupil of said observer, said relay optical system has a concave-reflective surface, and the pupil of said relay optical system is located on the side of said image display means with respect to said concave-reflective surface of said relay optical system along said optical axis.

2. The apparatus according to claim 1, wherein said concave-reflective surface and said convex-reflective surface each are arranged as decentered relative to said optical axis and said convex-reflective surface is set at a position where said convex-reflective surface does not interrupt a beam directed toward the pupil of said observer after the beam from said image display means is reflected by said concave-reflective surface.

3. The apparatus according to claim 2, wherein at least one surface out of said concave, reflective surface and said convex-reflective surface is a reflective surface of a curved surface shape not having a rotation symmetry axis.

4. The apparatus according to claim 1, wherein said relay optical system is an optical system which is approximately telecentric on a side of said aerial image.

5. The apparatus according to claim 1, wherein said relay optical system has at least one refracting lens set as decentered relative to the optical axis thereof.

6. The apparatus according to claim 1, wherein said relay optical system has a reflective surface.

7. The apparatus according to claim 6, wherein said relay optical system has a concave-reflective surface, a convex-reflective surface, and a concave-reflective surface in order from the side of said convex-reflective surface along said optical axis.

8. The apparatus according to claim 1, wherein said concave-reflective surface of said observation optical system includes a beam splitter having a predetermined light transmittance.

9. The apparatus according to claim 1, wherein the beam from said image display means is guided to either left or right pupil of the observer by said observation optical system and two said image display apparatus and two image observation optical systems are symmetrically arranged for the left and right pupils of the observer.

10. The apparatus according to claim 9, wherein the beam from said image display means is guided through eyeglasses to either left or right pupil of the observer by said observation optical system.

11. The apparatus according to claim 1, further comprising holding means for securing said image display apparatus to the head of said observer.

* * * * *